United States Patent
Zeng

[19]

[11] Patent Number: 6,038,039
[45] Date of Patent: Mar. 14, 2000

[54] CHARACTER SMOOTHING IN SCANNERS/PRINTERS

[75] Inventor: Laiguang Zeng, Rochester, N.Y.

[73] Assignee: A. B. Dick Company, Niles, Ill.

[21] Appl. No.: 09/013,688

[22] Filed: Jan. 26, 1998

Related U.S. Application Data

[63] Continuation of application No. 08/362,664, Dec. 21, 1994, abandoned.

[51] Int. Cl.[7] .................................................. H04N 1/40
[52] U.S. Cl. .......................... 358/447; 358/448; 358/462; 382/266; 382/269
[58] Field of Search .................................. 358/447, 448, 358/455, 456, 462, 464; 382/195, 199, 203, 254, 264, 266, 269

[56] References Cited

U.S. PATENT DOCUMENTS

| | | |
|---|---|---|
| 4,493,105 | 1/1985 | Beall et al. . |
| 4,791,679 | 12/1988 | Barski et al. . |
| 4,847,641 | 7/1989 | Tung . |
| 5,029,108 | 7/1991 | Lung . |
| 5,293,579 | 3/1994 | Stockholm . |
| 5,327,260 | 7/1994 | Shimomae et al. ..................... 358/448 |
| 5,327,262 | 7/1994 | Williams ................................. 358/462 |
| 5,396,584 | 3/1995 | Lee et al. . |

FOREIGN PATENT DOCUMENTS

| | | |
|---|---|---|
| 0488534 | 10/1991 | European Pat. Off. . |
| 0506379 | 9/1992 | European Pat. Off. . |
| 0584966 | 3/1994 | European Pat. Off. . |

OTHER PUBLICATIONS

Xue, Winans and Walowit, "An Edge–Restricted Spatial Interpolation Algorithm," *Journal of Electronic Imaging*, vol. 1(2) at 152–61 (Apr. 1992).

Chang and Tang, "New Transformation of Control Points in Scaling Discrete Polygons," *Journal of Electronic Imaging*, vol. 1(2) at 162–70 (Apr., 1992).

Research Disclosure Reference 36616, "Exposure Scheme Using LED Writer for Image Enhancement" dated Oct. 1994 (a copy is enclosed herewith).

European Search Report Dated Apr. 11, 1996 in Application No. EP 95308871.

*Primary Examiner*—Thomas D. Lee
*Attorney, Agent, or Firm*—Morgan & Finnegan, L.L.P.

[57] ABSTRACT

A scanner/printer system for smoothing the edges of text or line art is described having a copyboard for an image original, a CCD, a PCI bus, edge smooth software and a laser printer. The edge smooth software adds variable size fill-in patterns of pixels to the image data scanned by the CCD at low resolution to smooth the edges of text or line art prior to printing at high resolution.

23 Claims, 25 Drawing Sheets

U TYPE CORNER
SHAPE (CORNER)=(6U,6)

U TYPE CORNER
SHAPE (CORNER)=(6,6U)

U TYPE CORNER
SHAPE (CORNER)=(6U,6U)

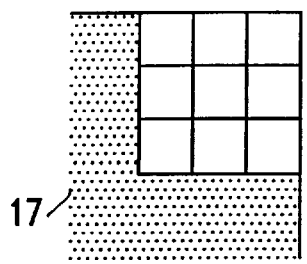 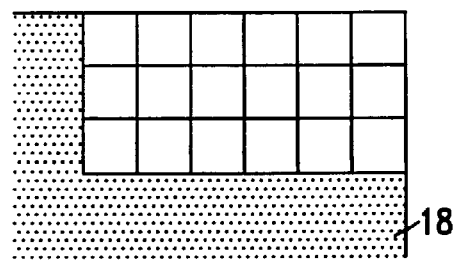
FIG. 5A    FIG. 5B
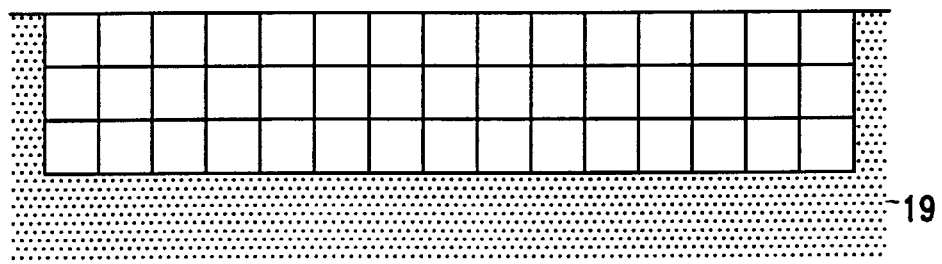
FIG. 5C
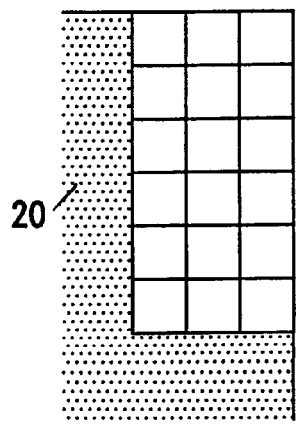 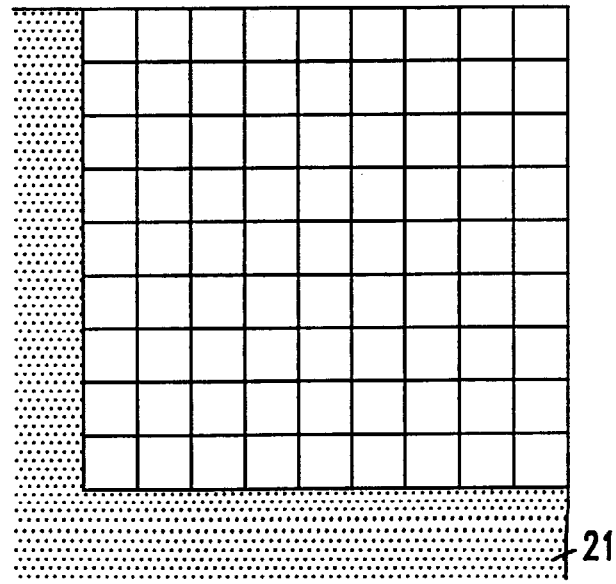
FIG. 5D    FIG. 5E

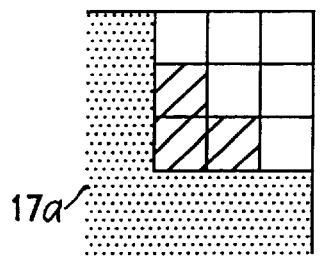 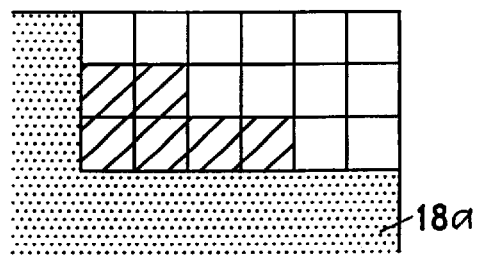
FIG. 6A        FIG. 6B
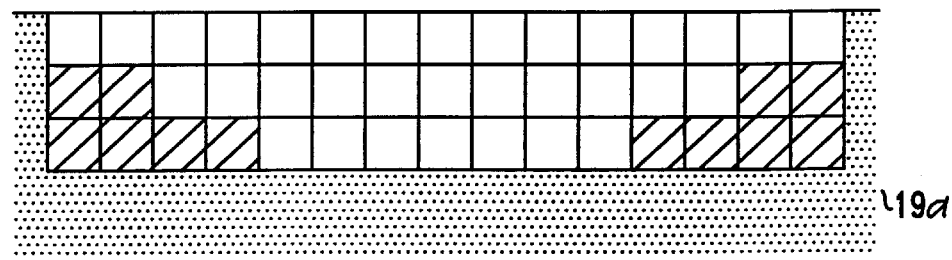
FIG. 6C
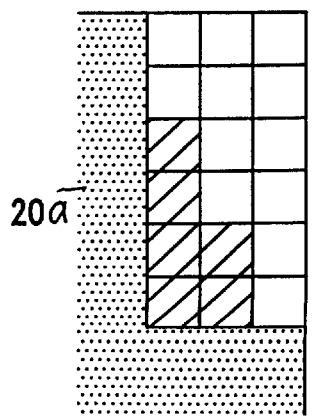 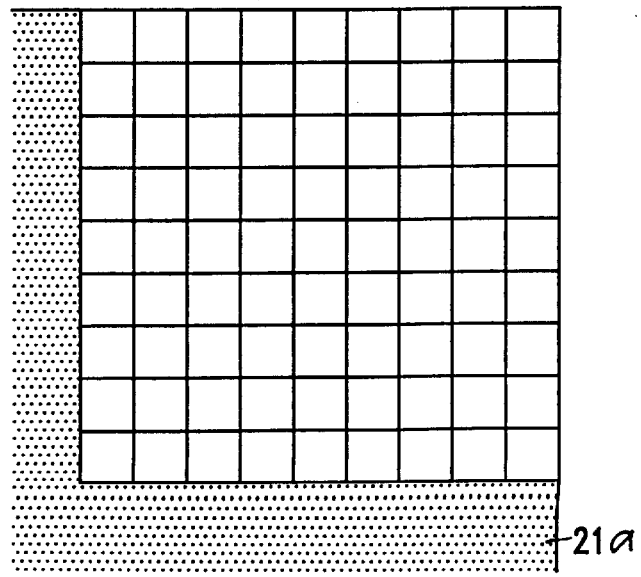
FIG. 6D        FIG. 6E a) SHAPE (corner)=(3,3)

VERTICAL LEG IS 3
HORIZONTAL LEG IS 3 b) ADD THREE PIXELS

VERTICAL LEG IS 3
HORIZONTAL LEG IS 3 a) SHAPE (corner)=(6,3)

VERTICAL LEG IS 6
HORIZONTAL LEG IS 3 b) ADD SIX PIXELS

VERTICAL LEG IS 6
HORIZONTAL LEG IS 3 a) SHAPE (corner)=(9,3)

VERTICAL LEG IS 9
HORIZONTAL LEG IS 3 b) ADD ELEVEN PIXELS

VERTICAL LEG IS 9
HORIZONTAL LEG IS 3 a) SHAPE (corner)=(X,3)
WHERE X>9

VERTICAL LEG IS >9
HORIZONTAL LEG IS 3 b) ADD ELEVEN PIXELS

VERTICAL LEG IS >9
HORIZONTAL LEG IS 3 a) SHAPE (corner)=(3,6)

VERTICAL LEG IS 3
HORIZONTAL LEG IS 6 b) ADD SIX PIXELS

VERTICAL LEG IS 3
HORIZONTAL LEG IS 6 a) SHAPE (corner)=(3,9)

VERTICAL LEG IS 3
HORIZONTAL LEG IS 9 b) ADD ELEVEN PIXELS

VERTICAL LEG IS 3
HORIZONTAL LEG IS 9 a) SHAPE (corner)=(3,X)
WHERE X>9

VERTICAL LEG IS 3
HORIZONTAL LEG IS >9 b) ADD ELEVEN PIXELS

VERTICAL LEG IS 3
HORIZONTAL LEG IS >9 a) SHAPE (corner)=(6,6)

VERTICAL LEG IS 6
HORIZONTAL LEG IS 6 b) ADD FIFTEEN PIXELS

VERTICAL LEG IS 6
HORIZONTAL LEG IS 6 a) SHAPE (corner)=(9,6)

VERTICAL LEG IS 9
HORIZONTAL LEG IS 6 b) ADD TWENTY FOUR PIXELS

VERTICAL LEG IS 9
HORIZONTAL LEG IS 6 a) SHAPE (corner)=(X,6) WHERE X>9

VERTICAL LEG IS >9
HORIZONTAL LEG IS 6 b) ADD TWENTY FOUR PIXELS

VERTICAL LEG IS >9
HORIZONTAL LEG IS 6 b) ADD TWENTY FOUR PIXELS

VERTICAL LEG IS 6
HORIZONTAL LEG IS 9 a) SHAPE (corner)=(6,9)

VERTICAL LEG IS 6
HORIZONTAL LEG IS 9 a) SHAPE (corner)=(6,X)
WHERE X>9

VERTICAL LEG IS 6
HORIZONTAL LEG IS >9 b) ADD TWENTY FOUR PIXELS

VERTICAL LEG IS 6
HORIZONTAL LEG IS >9 a) SHAPE (corner)=(3U,3)

VERTICAL LEG IS 3
AND U TYPE CORNER
HORIZONTAL LEG IS 3 b) ADD TWO PIXELS

VERTICAL LEG IS 3
AND U TYPE CORNER
HORIZONTAL LEG IS 3 a) SHAPE (corner)=(3U,6)

VERTICAL LEG IS 3
AND U TYPE CORNER
HORIZONTAL LEG IS 6 b) ADD THREE PIXELS

VERTICAL LEG IS 3
AND U TYPE CORNER
HORIZONTAL LEG IS 6 a) SHAPE (corner)=(3U,X)    b) ADD FOUR PIXELS
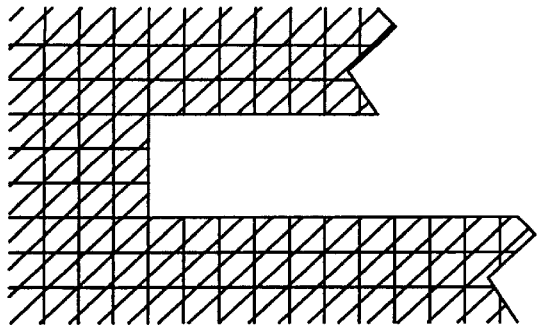 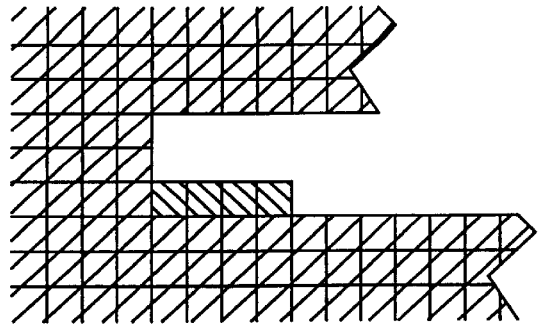
VERTICAL LEG IS 3
AND U TYPE CORNER
HORIZONTAL LEG IS = OR >9
FIG. 21A
VERTICAL LEG IS 3
AND U TYPE CORNER
HORIZONTAL LEG IS = OR >9
FIG. 21B
a) SHAPE (corner)=(6U,3)    b) ADD THREE PIXELS
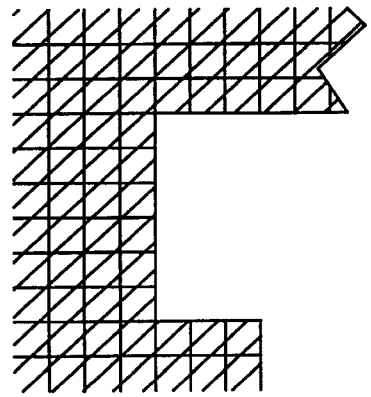 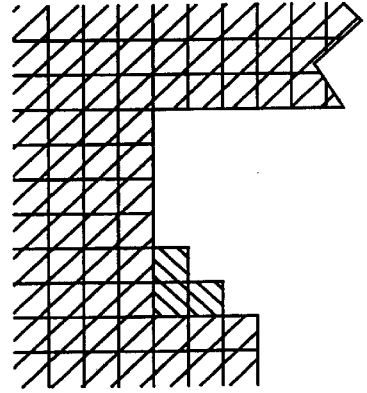
VERTICAL LEG IS 6
AND U TYPE CORNER
HORIZONTAL LEG IS 3
FIG. 22A
VERTICAL LEG IS 6
AND U TYPE CORNER
HORIZONTAL LEG IS 3
FIG. 22B a) SHAPE (corner)=(6U,6)

VERTICAL LEG IS 6
AND U TYPE CORNER
HORIZONTAL LEG IS 6 b) ADD SIX PIXELS

VERTICAL LEG IS 6
AND U TYPE CORNER
HORIZONTAL LEG IS 6 a) SHAPE (corner)=(6U,X)
WHERE X = OR >9

VERTICAL LEG IS 6
AND U TYPE CORNER
HORIZONTAL LEG IS = OR >9 b) ADD ELEVEN PIXELS

VERTICAL LEG IS 6
AND U TYPE CORNER
HORIZONTAL LEG IS = OR >9 a) SHAPE (corner)=(9U,3)

VERTICAL LEG IS 9
AND U TYPE CORNER
HORIZONTAL LEG IS 3 b) ADD THREE PIXELS

VERTICAL LEG IS 9
AND U TYPE CORNER
HORIZONTAL LEG IS 3 a) SHAPE (corner)=(9U,6)

VERTICAL LEG IS 9
AND U TYPE CORNER
HORIZONTAL LEG IS 6 b) ADD SIX PIXELS

VERTICAL LEG IS 9
AND U TYPE CORNER
HORIZONTAL LEG IS 6 a) SHAPE (corner)=(9U,X)
WHERE X = OR >9

VERTICAL LEG IS 9
AND U TYPE CORNER
HORIZONTAL LEG IS = OR >9 b) ADD ELEVEN PIXELS

VERTICAL LEG IS 9
AND U TYPE CORNER
HORIZONTAL LEG IS = OR >9 a) SHAPE (corner)=(12U,3)
WHERE X= OR >9

VERTICAL LEG IS 12
AND U TYPE CORNER
HORIZONTAL LEG IS 3 b) ADD SIX PIXELS

VERTICAL LEG IS 12
AND U TYPE CORNER
HORIZONTAL LEG IS 3 a) SHAPE (corner)=(15U,3)

VERTICAL LEG IS 12
AND U TYPE CORNER
HORIZONTAL LEG IS 3 b) ADD SIX PIXELS

VERTICAL LEG IS 12
AND U TYPE CORNER
HORIZONTAL LEG IS 3

CHARACTER SMOOTHING IN SCANNERS/ PRINTERS

This is a continuation of application Ser. No. 08/362,664 filed Dec. 21, 1994 now aban.

REFERRING TO MICROFICHE APPENDIX

Incorporated herein is an appendix consisting of a microfiche card with eleven frames. The microfiche appendix is a sample of the edge smooth software program in C language for adding variable size fill-in patterns of pixels to variable size corners having a lower-left orientation at three times magnification.

FIELD OF THE INVENTION

This invention relates generally to scanner/printer systems, and, more particularly, to a system for smoothing the edges of text or line art printed at a resolution that is higher than the resolution at which the text characters or line art are scanned. The system includes edge smooth software which smooths the edges of the text or line art imaged by a scanner and subsequently printed.

BACKGROUND OF THE INVENTION

Scanner/printer systems, such as a digital platemaker, a digital printer, a digital duplicate machine or a facsimile machine, which reproduce copies of an original document contain one or more photosensitive elements, such as a multiple photosite array of charge coupled devices, commonly referred to as CCD's, for scanning the original document to derive image data which is then made available to the image processing system for laser printing. When an original document in text form is scanned through a CCD, some of the information, such as in character strokes, may be lost, which can cause the characters to appear jagged, like stairs, after printing.

Heretofore, methods and apparatus for enhancing the sharp edges and details from an original imaging source have been known. Xue, Winans, and Walowit, "An Edge-Restricted Spatial Interpolation Algorithm," *Journal Of Electronic Imaging,* Vol. 1(2) at 152–61 (April 1992) address how to generate high spatial resolution image data from a low spatial resolution imaging source. They disclose an edge-restricted spatial interpolation algorithm developed to increase the image resolution and at the same time to enhance the sharp edges and details from the original imaging source. One of the disadvantages of using the algorithm disclosed by Xue, Winans and Walowit is that it scans the image in gray scale form, such that each input pixel has up to 256 variables. As a result, this system uses a costly and time consuming software program particularly in view of the time it takes to execute memory and input/output functions.

Chang and Tang, "New Transformation Of Control Points In Scaling Discrete Polygons," *Journal Of Electronic Imaging,* Vol. 1(2) at 162–70 (April 1992) disclose a bit mapping technique in a scanner/printer system for smoothing the edges of characters that are printed at a resolution that is higher than the resolution at which the characters are scanned. Bit map form uses two variable pixels, contrary to the gray scale form which uses a much more complex series of pixels having up to 256 variables. The bit mapping technique disclosed by Chang and Tang, however, uses an algorithm with pixels in a polygon data matrix form which again results in a system which uses a costly and time consuming software program.

Other image processing systems also teach enhancing the sharp edges and details from an original imagining source. However, these systems use hardware, not software, to accomplish such results. For example, U.S. Pat. No. 5,237,260, issued to Shimomae et al., discloses an image processing system for smoothing edges of an image. Unlike the methods and apparatus disclosed by Xue et al. and Change et al. which use software programs to smooth the edges of an image, the '260 patent discloses the use of optical and laser hardware to change the output pixel size in order to smooth the edges of an image. Similarly, U.S. Pat. No. 5,327,262, issued to Williams, discloses a system for detecting different types of image data and smoothing the contrast between such data. Williams uses standard integrated circuit component hardware to accomplish this result. The use of hardware, as disclosed in Shimomae et al. and Williams, increases the expense of the system compared to systems which use software.

OBJECTS OF THE INVENTION

It is an object of the invention to provide a new and improved scanner/printer system to smooth the jagged edges of characters or line art that are printed at a resolution that is higher than the resolution at which the characters or line art are scanned.

It is also an object of the invention to provide a new and improved scanner/printer system including edge smooth software which minimizes the time and expense in smoothing the jagged edges of characters or line art.

Another object of the invention is to provide a new and improved scanner/printer system including edge smooth software which smooths jagged edges by locating the jagged edges and adding image data pixels in bit map form to fill in the jagged edges.

A further object of the invention is to provide a new and improved scanner/printer system including edge smooth software which adds variable size patterns of image data pixels to proportionally fill in the variable size jagged edges.

A still further object of the invention is to provide a new and improved scanner/printer system including edge smooth software which smooths jagged edges by deleting or subtracting pixels associated with the jagged edges.

The foregoing specific objects and advantages of this invention are illustrative of those which can be achieved by the present invention and are not intended to be exhaustive or limiting of the possible advantages which can be realized. Thus, these and other objects and advantages of this invention will be apparent from the description herein or can be learned from practicing this invention, both as embodied herein or as modified in view of any variations which may be apparent to those skilled in the art. Accordingly, the present invention resides in the novel parts, constructions, arrangements, combinations and improvements herein shown and described.

SUMMARY OF THE INVENTION

The above-mentioned and other objects of the invention are met by a scanner/printer system having edge smooth software which smooths the edges of characters that are printed at a resolution that is higher than the resolution at which the characters are scanned. The original, for example, a document in text form, is scanned line by line by a CCD so that the image of the original is translated into an array or image data pixels. The image data pixels pass through the edge smooth software which adds variable size fill-in patterns of pixels to eliminate sharp or jagged edges in the curves and diagonals of the character stroke images produced by the CCD.

Specifically, when text is scanned using a CCD array, some of the information, such as in character stroke data, may be lost, which can cause the characters to have jagged edges, like stairs. Generally, the jagged edges have four different orientational angles, hereinafter referred to as corners. To smooth the jagged edges of the corners, the edge smooth software first searches for the corners, as well as the features of each corner, including its orientation, position and shape. The software then adds variable size fill-in patterns of pixels to smooth the jagged edges (hereinafter, jaggies) in each of the corners where the added pixel pattern is in accord with the orientation position and shape of the corner. The invention has been found to smooth jaggies in English, Chinese and Japanese character sets, as well as in line art, and can also smooth character edges, from any language, in bit map form. As used herein, "line art" is any color (i.e., black) and background (i.e., white) image except for text, such as but not limited to a drawing.

It will be appreciated by those skilled in the art that the foregoing brief description and the following detailed description are exemplary and explanatory of this invention, but are not intended to be restrictive thereof or limiting of the advantages which can be achieved by this invention. Thus, the accompanying drawings, referred to herein and constituting a part hereof, illustrate preferred embodiments of this invention and, together with the detailed description, serve to explain the principles of this invention.

BRIEF DESCRIPTION OF THE DRAWINGS

The above and other objects, features and advantages of this invention will be apparent from the following detailed description, especially when taken in conjunction with the accompanying drawings, wherein:

FIG. 5 is an illustration of several types of corners prior to smoothing;

FIG. 6 is an illustration of several types of corners after smoothing;

FIGS. 7–29 are illustrations of the lower-left corners which are located by the edge smooth software and the corresponding variable size pattern of pixels added to each lower-left corner;

DETAILED DESCRIPTION OF THE PREFERRED EMBODIMENTS

Figure 1:
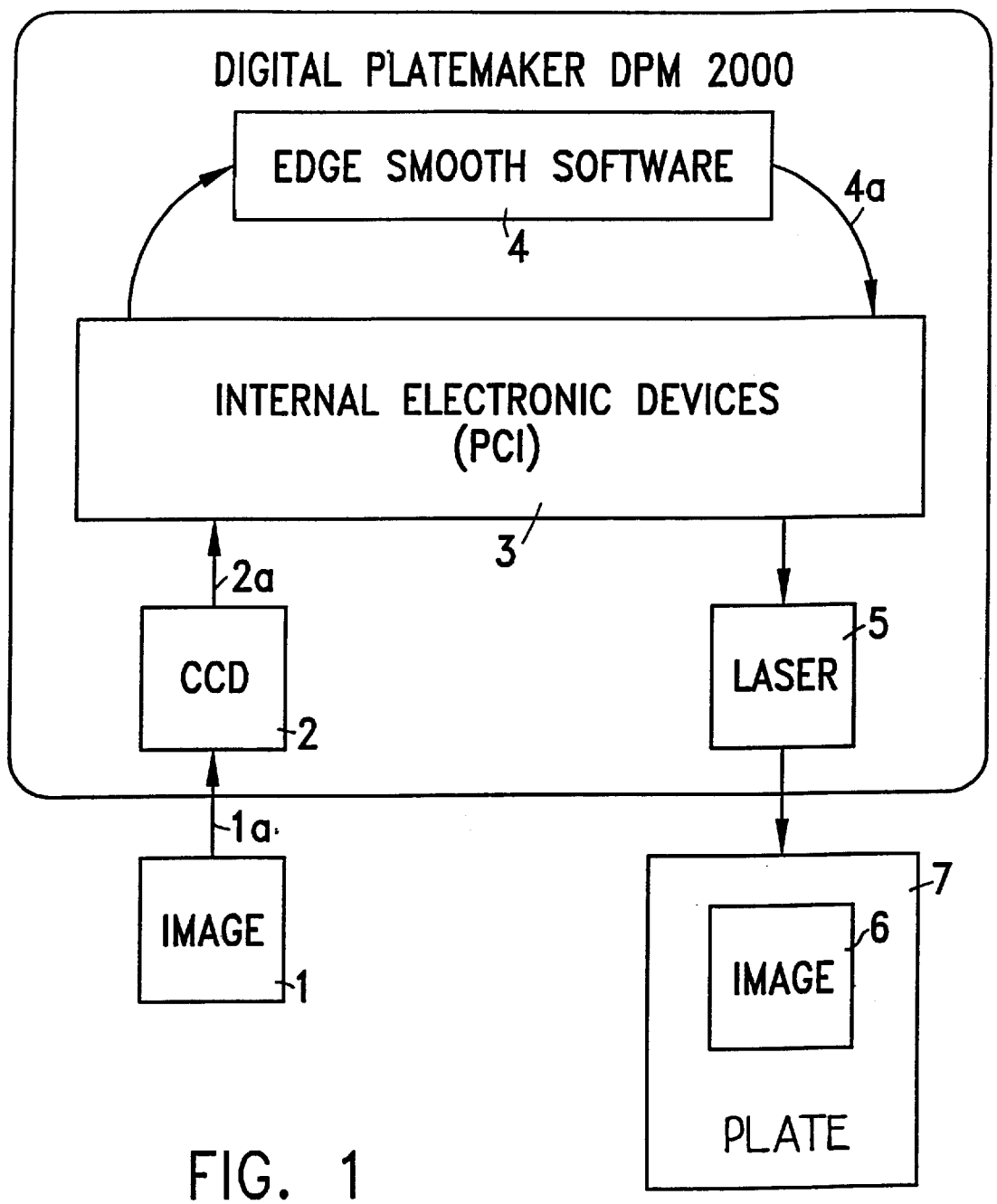
FIG. 1 is a schematic depiction of the scanner/printer apparatus and system according to the invention.
Figure 2A:
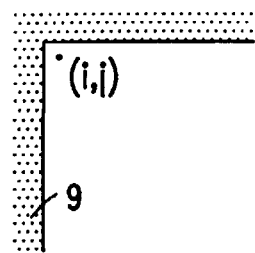
FIG. 2 is an illustration of the orientation of the lower-left corner, the upper-left corner, the lower-right corner and the upper-right corner of a data image.
Figure 2C:
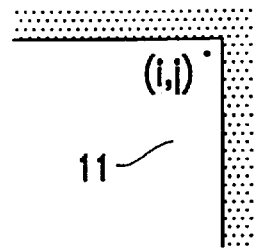
Figure 2B:
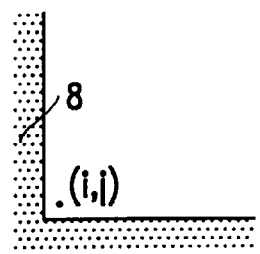
Figure 2D:
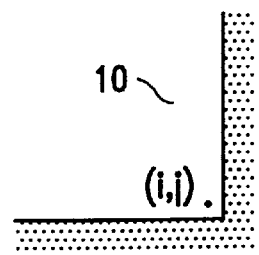

The scanner/printer system of the invention is suitable for use in any optical platemaker which projects an original image from a copyboard to a plate, such as a digital platemaker, digital printer, digital duplicate machine, or facsimile machine for use in connection with text or line art. FIG. 1 shows a schematic of the invention in a Digital Platemaker DPM 2000 system. A Digital Platemaker DPM 2000 scans several images from a copyboard at a time and passes the image data to a computer. The computer, in turn, applies various processing algorithms to the image, including smoothing, sizing, rotation, insertion of data from other images and storing the image. Finally, the computer composes one or more of the processed images into a single image and a laser is used to print the final image onto plate material.

As shown in FIG. 1, copyboard 1 provides a plane for the image bearing original. The image of the original shown by arrow 1a is projected by the conventional means, such as a lens, of a digital platemaker, printer, duplicative machine or facsimile toward the CCD 2. Image data in the form of video image signals (hereinafter, image data pixels) is obtained through line by line scanning of the image bearing original by one or more photosensitive elements. Line by line scanning of an image bearing original for the derivation of image data is well known in the art. Image data may also be derived by a photomultiplier or a computer or workstation programmed in accordance with document creation application software, or from a data storage device.

The image data pixels are in bit map form such that each image data type has two variables (hereinafter, (i,j)). Since the invention is suitable for text or line art, each pixel has one of two values. For example, where the original consists of a typed document, the value of pixel (i,j) is represented by the function pixel (i,j), whose value is 0 for a non-image or background white area and 1 for an image or black typed area.

As shown in FIG. 1, the document image 1a is scanned line by line by CCD 2 to obtain an array of image data pixels. The array of image data pixels 2a is then transferred and made available to the edge smooth software 4 by internal electronic devices 3 (hereinafter, the peripheral component (PCI) bus). A PCI bus for transferring image data to and from computer software is the latest bus architecture to address the performance time issue associated with personal computers. A PCI bus provides a data path capable of accessing up to 264 megabytes of data per second. The edge smooth software 4 may run on a computer based on an Intel 486 Microprocessor.

When text or line art is scanned through a CCD, some of the information, such as character stroke data, may be lost which can cause the characters to appear jagged, like stairs. In accordance with the invention, the edge smooth software 4 adds fill-in pixels to smooth sharp edges or jaggies in the curves and diagonals of character strokes produced by a scanner. Generally, the jaggies have four different orientational angles or corners. To smooth the jaggies of the corners, the software first searches the corner, as well as its features, including its orientation, position and shape. The software then adds variable size fill-in patterns of pixels proportional to the size of each corner to eliminate or smooth the jaggies. The number of pixels and the particular pattern of pixels added to each corner depends on the features of the corner, including the orientation, position and shape of the corner.

After the software adds the variable size fill-in patterns of pixels to the image data, the enhanced image 4a with smoothed edges is stored by the software and then passed by the PCT bus 3 to a laser 5 for printing the final image 6 onto the image plane 7. Laser printing is well known in the art, particularly in connection with digital platemakers and printers as well as digital duplicate machines or facsimile machines.

Before describing the edge smooth software in detail, some relative terms are described below to assist in the understanding of the software.

The origin of image coordinates is located at the upper-left corner of the image at position (0,0). The coordinate format (i,j) represents a pixel's position in the image, where i increases in value in a downward direction from the origin and j increases in value as one moves away from the right-hand side of the origin. For text or line art, the value of pixel (i,j) is represented by the function pixel (i,j) whose value is 0 for a background (i.e., white) pixel and 1 for a color (i.e., black) pixel.

The software searches the image data pixels for the four types of oriented corners. The orientation of each of the four corners (hereinafter, orientation(corner)), is illustrated in FIG. 2. As described below, the software finds a corner by locating the pixels which form the corner.

Orientation(corner) 8 is the lower-left corner shown in FIG. 2. For any pixel (i,j) in an image, if the four pixels adjacent to it satisfy the conditions: pixel(i−1,j)=0; pixel(i,j+1)=0; pixel(i,j−1)=1; and pixel(i+1,j)=1; then pixels (i,j−1) and (i+1,j) form the lower-left corner, where pixel (i,j) is in the corner.

Orientation(corner) 9 is the upper-left corner shown in FIG. 2. For any pixel (i,j) in an image, if the four pixels adjacent to it satisfy the conditions: pixel(i+1,j)=0; pixel(i,j+1)=0; pixel(i,j−1)=1; and pixel(i−1,j)=1; then pixels (i,j−1) and (i−1,j) form the upper-left corner, where pixel (i,j) is in the corner.

Orientation(corner) 10 is the lower-right corner shown in FIG. 2. For any pixel (i,j) in an image, if the four pixels adjacent to it satisfy the conditions: pixel(i−1,j)=0; pixel(i,j−1)=0; pixel(i,j+1)=1; and pixel(i+1,j)=1; then pixels (i,j+1) and (i+1,j) form the lower-right corner, where pixel (i,j) is in the corner.

Orientation(corner) 11 is the upper-right corner shown in FIG. 2. For any pixel (i,j) in an image, if the four pixels adjacent to it satisfy the conditions: pixel(i+1,j)=0; pixel(i,j−1)=0; pixel(i,j+1)=1; pixel(i−1,j)=1; then pixels (i,j+1) and (i−1,j) form the lower-left corner, where pixel (i,j) is in the corner.

The position of a corner (i,j) (hereinafter, position (corner)) is the same as the position of the pixel in it. For example, if the position of a pixel in a corner is (i,j), then the position of the corner is position(corner)=(i,j).

Figure 3:
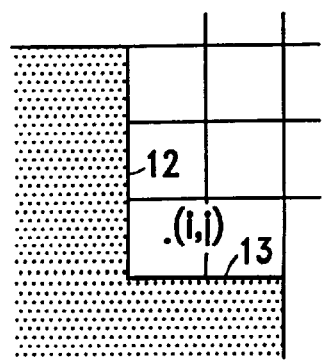
FIG. 3 is an illustration of the position, shape and orientation features of a corner of a data image.

As illustrated in FIG. 3, the shape of a corner (hereinafter, shape(corner)), is determined by the lengths of the two intersected edges 12 and 13, respectively, which form the corner. Specifically, where the position(corner) is (i,j), i denotes the first intersected edge 12 in a counterclockwise direction and j denotes the second intersected edge 13. The length of an edge is determined by the number of pixels in the edge. Thus, referring to FIG. 3, where the position (corner) is (i,j) and the orientation(corner) is the lower-left corner, the shape(corner) is (3,2). The number 3 corresponds to the number of pixels in the first intersected edge 12 and the number 2 corresponds to the number of pixels in the second intersected edge 13 for position (i,j).

Figure 4A:
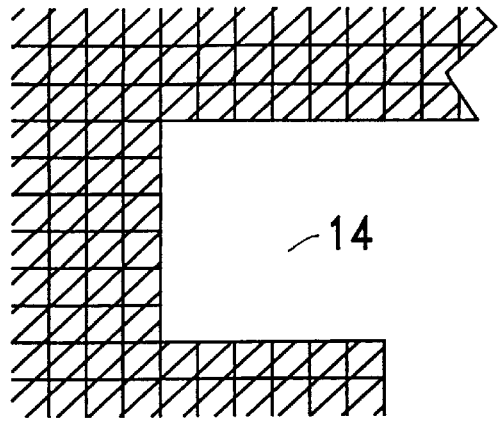
FIG. 4 is an illustration of several U-type corners.
Figure 4B:
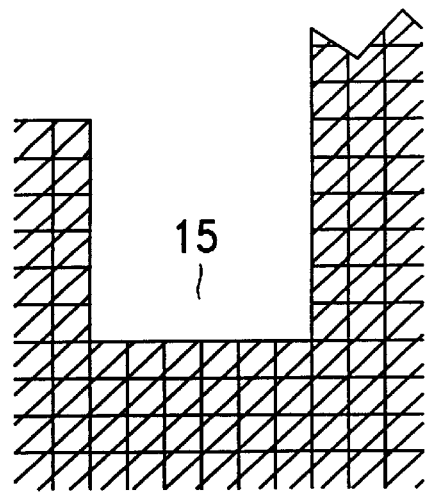
Figure 4C:
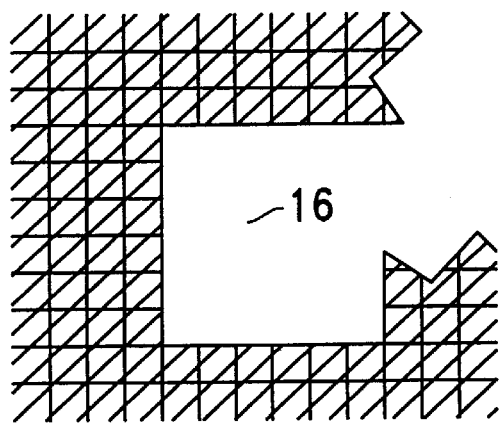
Figure 7A:
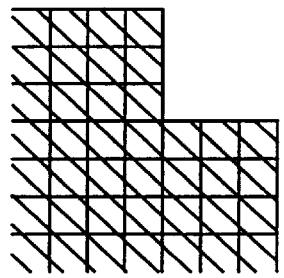
Figure 7B:
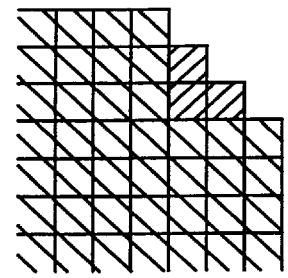
Figure 8A:
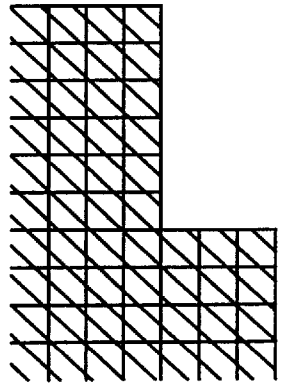
Figure 8B:
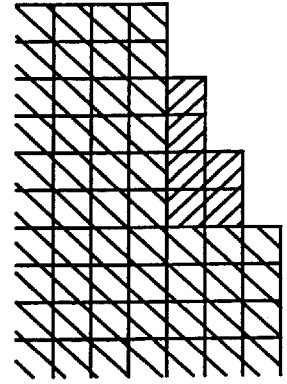
Figure 9A:
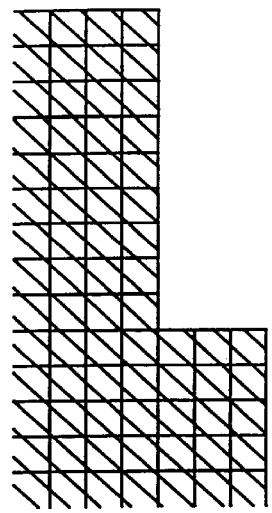
Figure 9B:
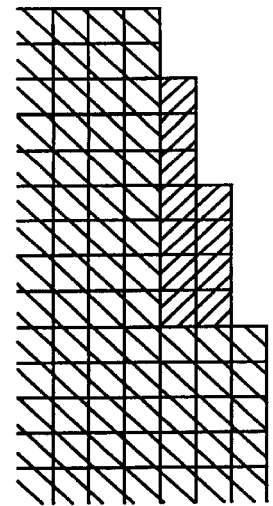
Figure 10A:
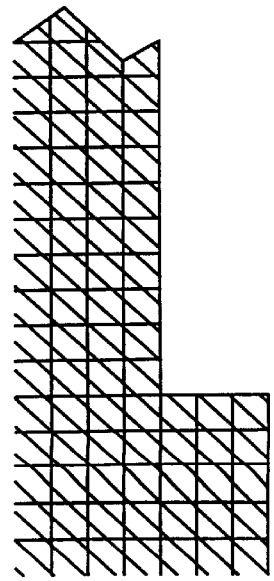
Figure 10B:
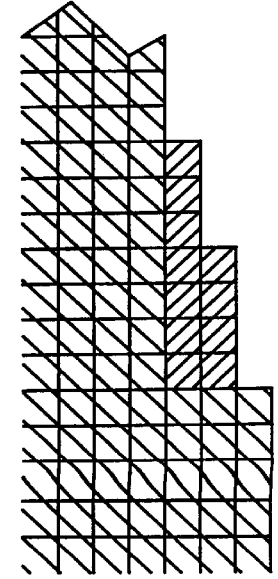
Figure 11A:
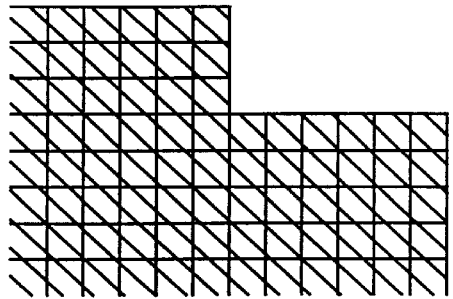
Figure 11B:
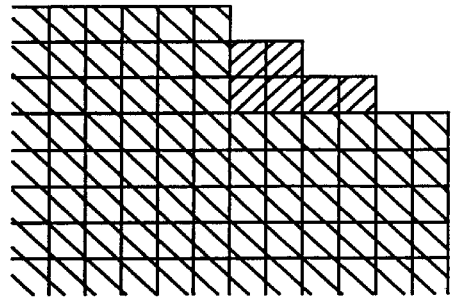
Figure 12A:
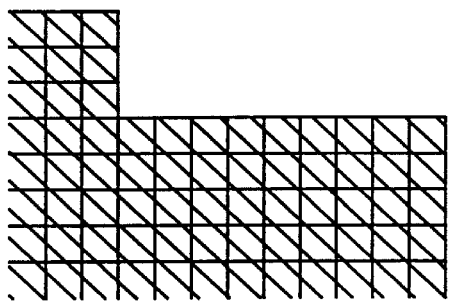
Figure 12B:
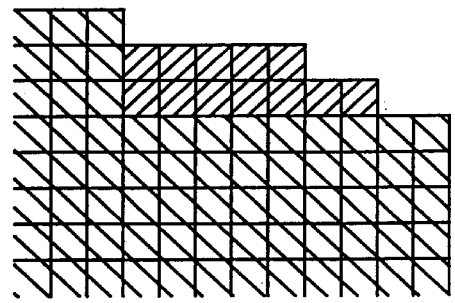
Figure 13A:
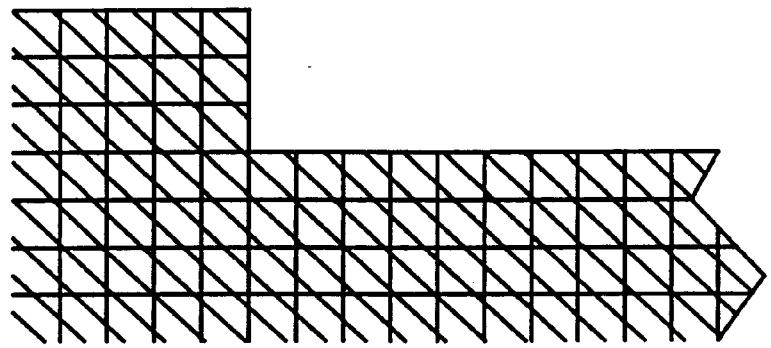
Figure 13B:
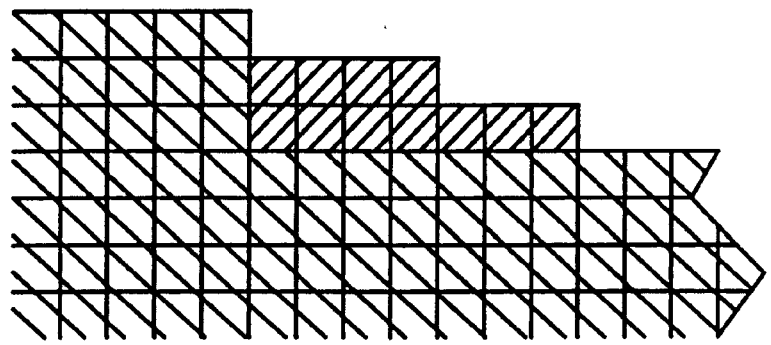
Figure 14A:
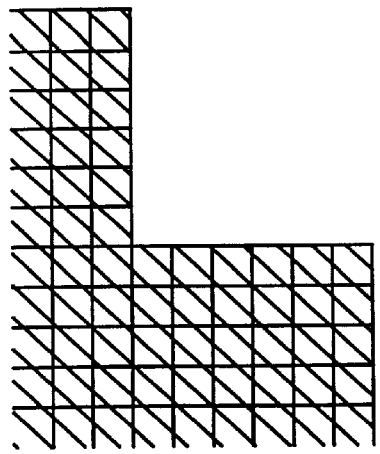
Figure 14B:
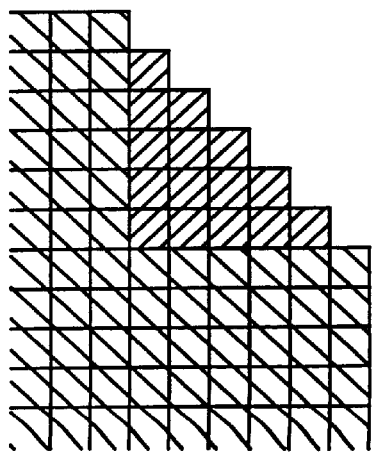
Figure 15A:
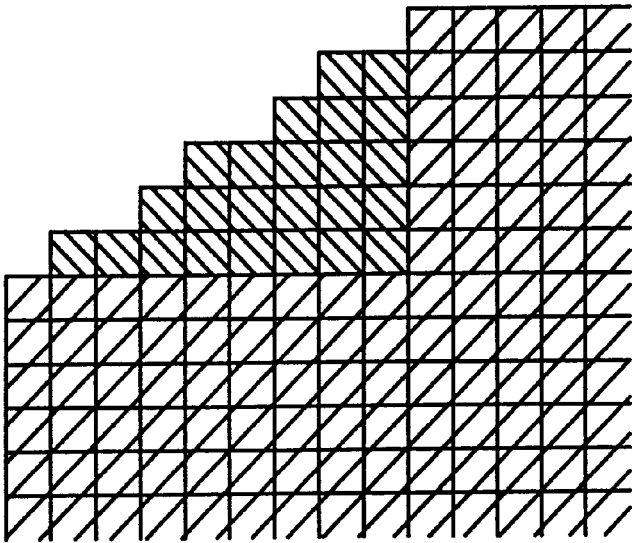
Figure 15B:
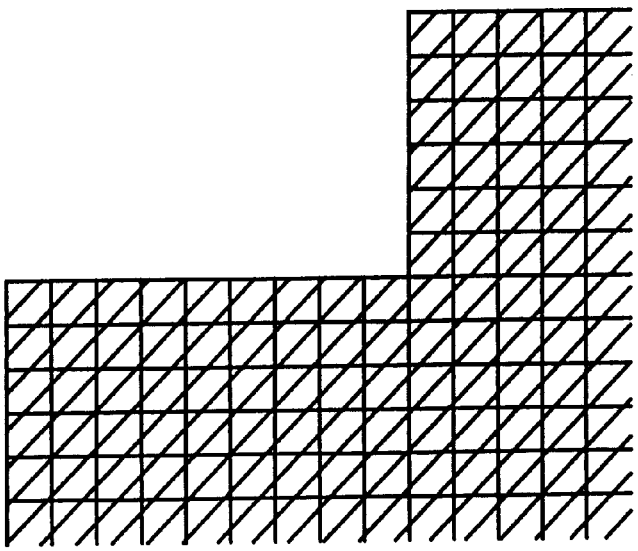
Figure 16A:
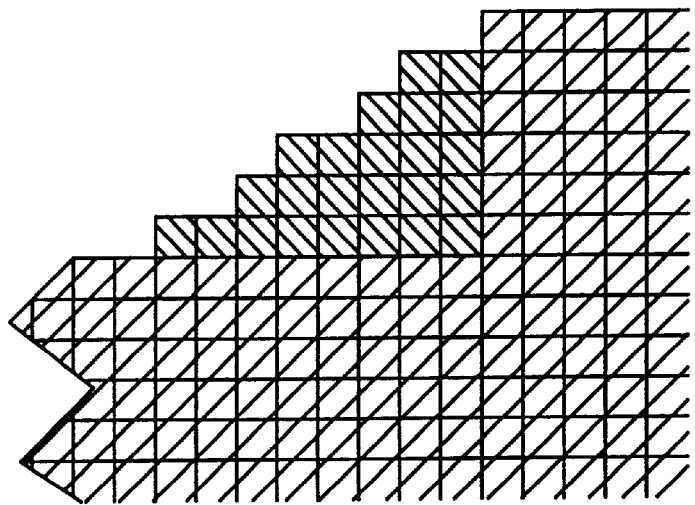
Figure 16B:
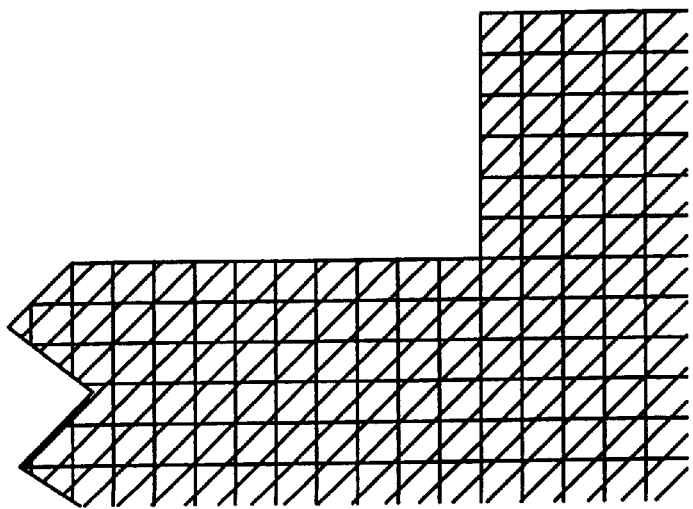
Figure 17B:
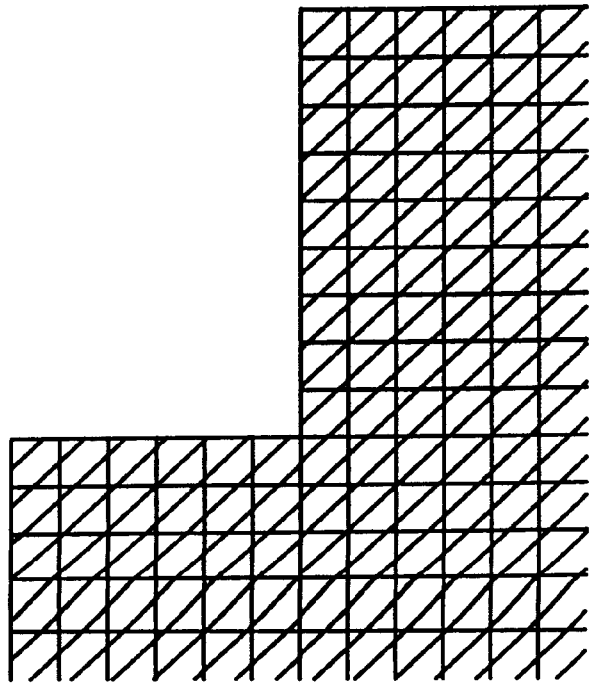
Figure 17A:
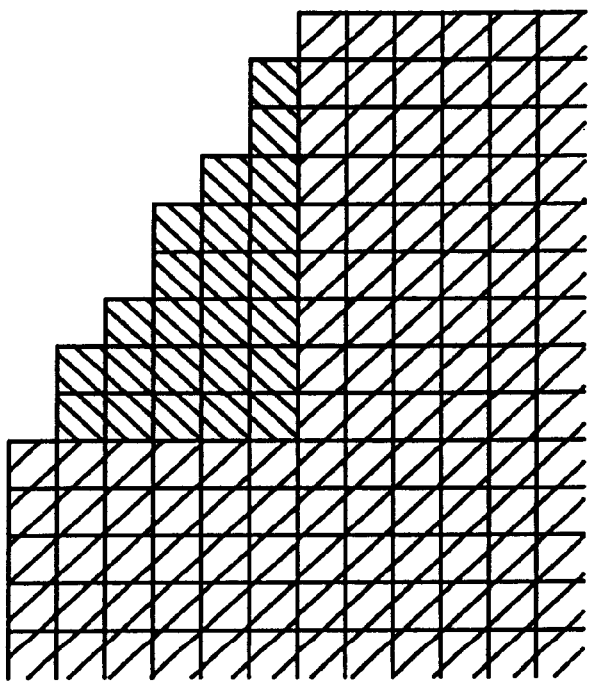
Figure 18A:
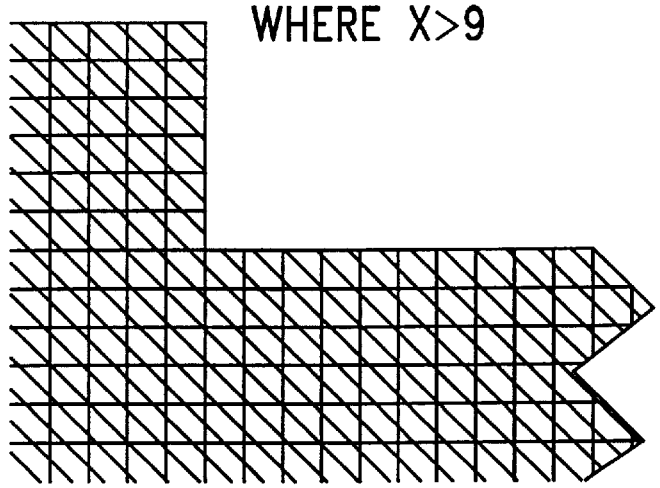
Figure 18B:
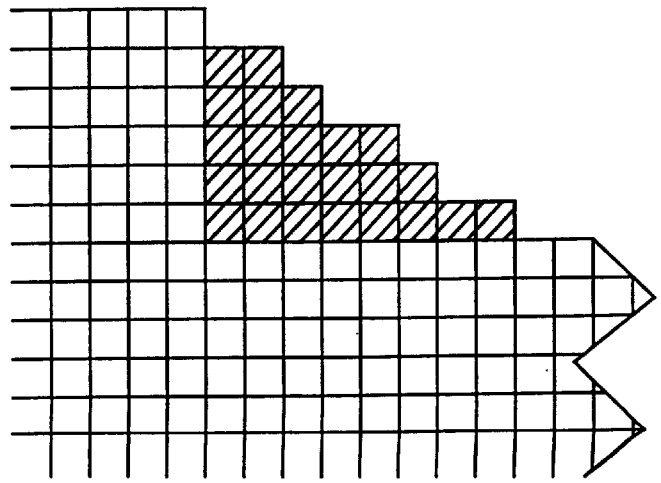
Figure 19A:
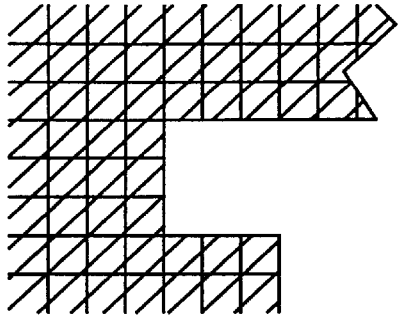
Figure 19B:
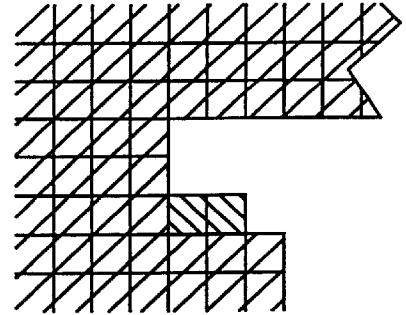
Figure 20A:
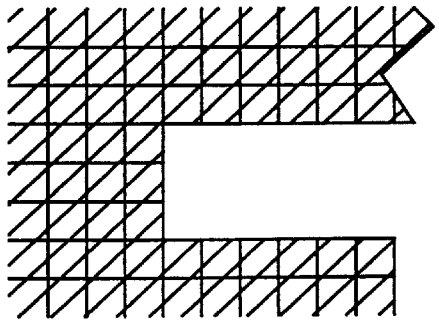
Figure 20B:
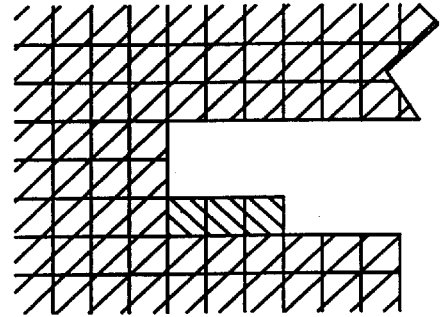
Figure 23A:
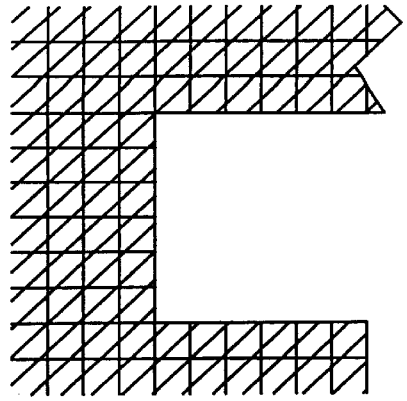
Figure 23B:
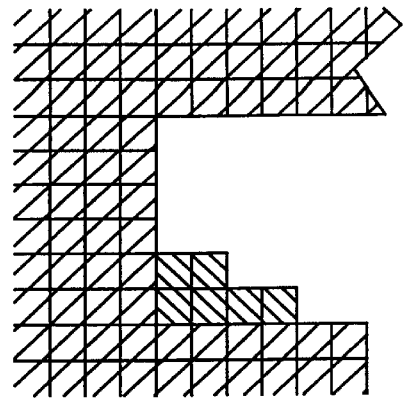
Figure 24A:
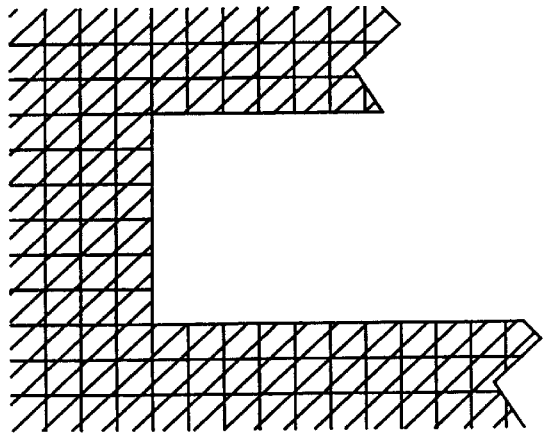
Figure 24B:
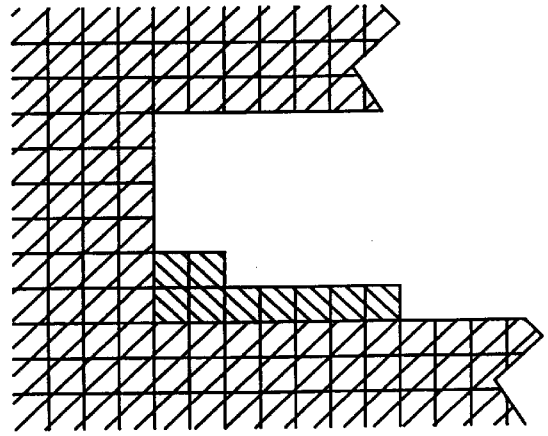
Figure 25A:
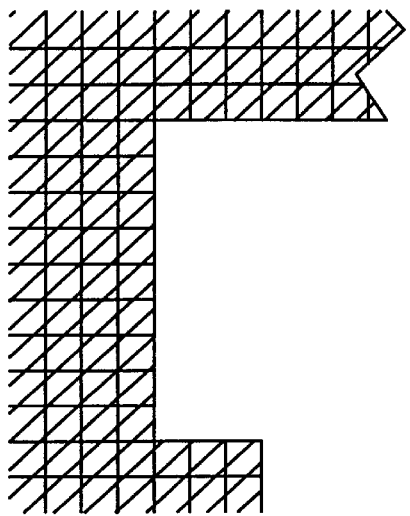
Figure 25B:
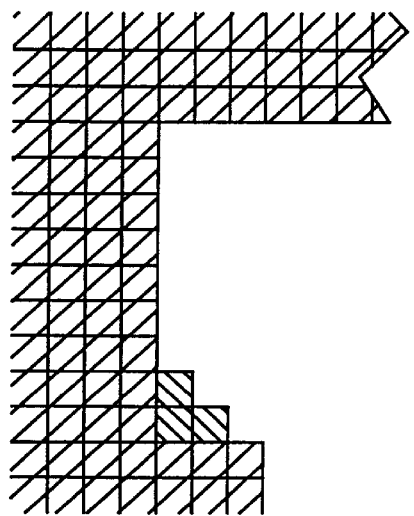
Figure 26A:
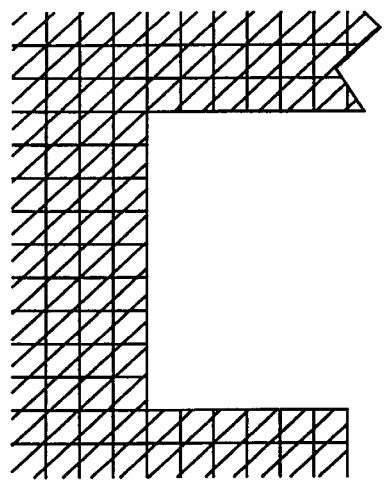
Figure 26B:
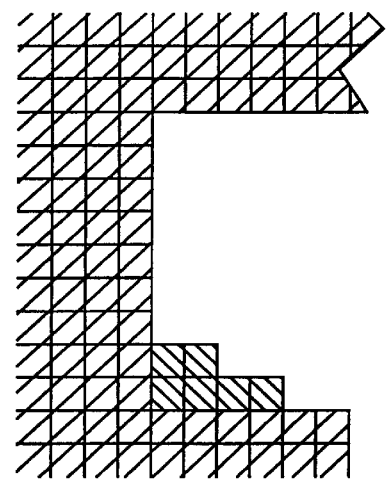
Figure 27A:
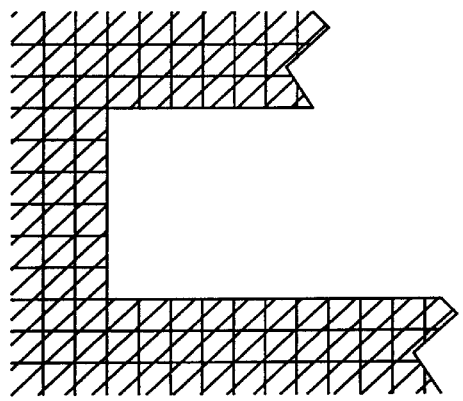
Figure 27B:
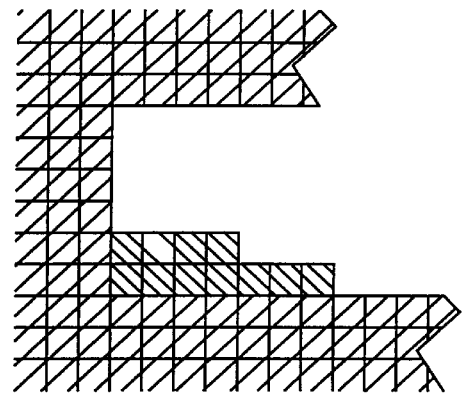
Figure 28A:
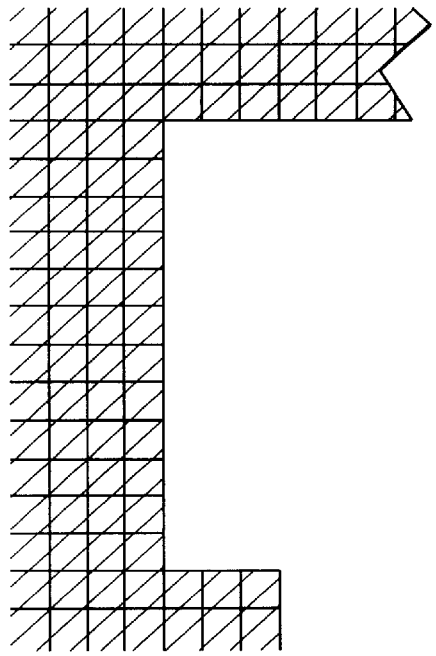
Figure 28B:
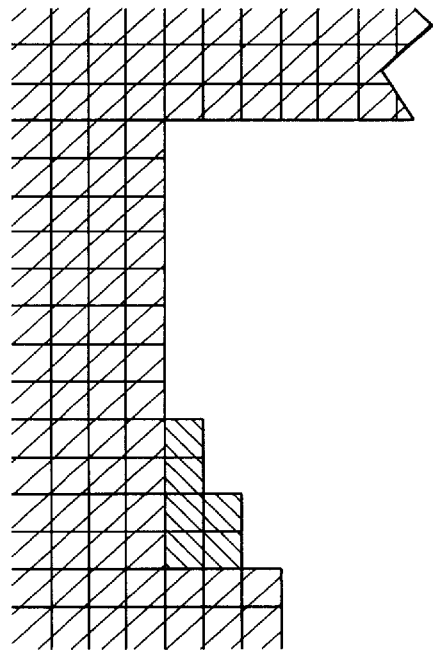
Figure 29A:
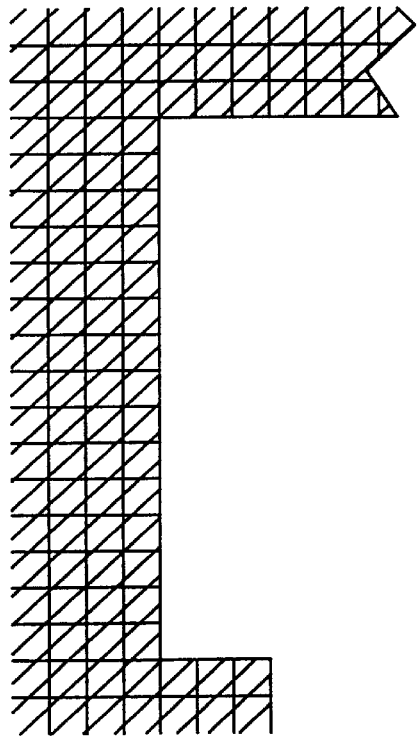
Figure 29B:
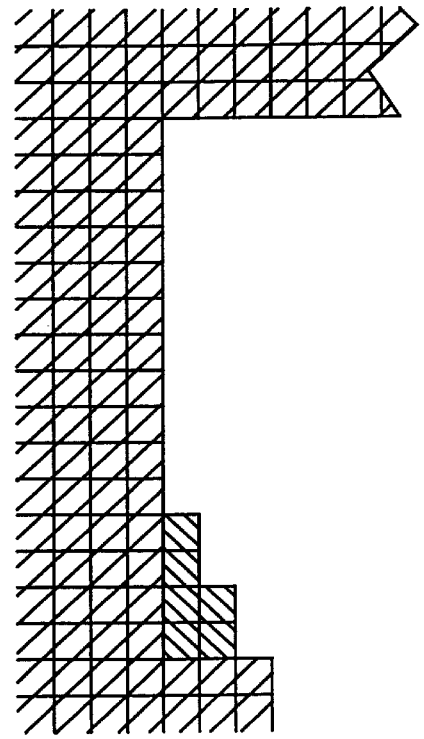

The software also locates all U-type corners. A U-type corner, as shown in FIG. 4, is defined as any two right-angle corners which share a common line segment, are separated by no more than a fifteen pixel distance along their common line segment and are both oriented in such a manner that each corner's non-shared line segment (where a non-shared line segment may, indeed, be shared by yet another right-angle corner) is both parallel to the non-shared line segment of the other corner and forms a right angle with the shared line segment on the same side of the shared line segment as the other corner.

Any U-shaped corner may be identified through its shape coordinates if either one or both of the shape coordinates are followed by the alphabetical character "U". For example, FIG. 4 shows a first U-type corner 14 with shape(corner) equal to (6U,6), where the first coordinate represents the pixel count in the vertical direction, the second coordinate represents the pixel count in the horizontal direction, and pixels are counted by starting in the upper-left hand corner of the image following the shape of the image in the counter-clockwise direction. The "U" in this case follows the first (vertical) shape coordinate because it identified the shared line segment of the U-type corner.

A second U-type corner 15 is shown where the shared line segment of the U-type corner is oriented horizontally and, thus, the "U" follows the second (horizontal) shape coordinate where shape(corner) is equal to (6,6U).

Finally, a third possible U-type corner 16 is shown where two right-angle corners share a common line segment less than fifteen pixels in length and one of the right-angle corner's non-shared line segment is shared with a third right-angle corner. Thus, both the vertical and horizontal shape coordinates are followed by "U"s where shape(corner) is equal to (6U,6U).

A comparison of FIGS. 5 and 6 shows how the software adds variable size fill-in patterns of pixels to enhance the corners of an image at three times magnification. FIG. 5 illustrates several corners located by the software prior to smoothing. Specifically, corner 17 has a shape(corner) equal to (3,3); corner 18 has a shape(corner) equal to (3,6); corners 19 have a lower-left and lower-right orientation, respectively, and a shape(corner) equal to (3,15); corner 20 has a shape(corner) equal to (6,3); and corner 21 has a shape(corner) equal to (9,9).

As is shown by FIG. 6, the software then adds variable size fill-in patterns of pixels proportional to the shape of each of corners 17, 18, 19 and 20 so as to enhance the corners or smooth their jagged edges, resulting in corresponding enhanced corners 17a, 18a, 19a and 20a. Specifically, 3 pixels were added to corner 17a, 6 pixels were added to corner 18a, 6 pixels were added to each corner 19a and 6 pixels were added to corner 20a. A comparison of corners 18a, 19a and 20a, to which the same number of pixels were added, shows that the pattern of fill-in pixels added to each corner varies depending upon the orientation and shape of each corner.

The software did not, however, add fill-in pixels to corner 21, as shown by corresponding corner 21a in FIG. 6. The software is programmed to add pixels to only certain corner shapes so that it does not interfere with such corners that are properly formed in text or line art. As shown by corner 21a in FIG. 6, the software was programmed to not add fill-in pixels to a corner where both of the legs are greater than or equal to 9 and the corner is not a U-type corner.

The number and pattern of the fill-in pixels to be added to each corner located by the software is programmed and can vary depending upon a number of factors including the pattern selected by the programmer as well as the magnification of the image. The microfiche appendix shows an example of the edge smooth software program in C language for adding variable size fill-in patterns of pixels. The C language program accords each pixel with three variables (i,j,k). The variables i and j are explained above. The additional variable k is associated with the computer memory. In the computer memory, there are eight bits in every byte (the smallest unit), and for the image storage, every byte can store eight pixels. The variable k has a value ranging from 0 to 7, corresponding to the position of each of the eight bits in a byte.

The software program shown in the microfiche appendix is limited to adding variable size fill-in patterns of pixels to corners having a lower-left orientation at three times magnification. All of the possible shapes of the corners having a lower-left orientation are predetermined and programmed for a particular magnification. The programmer also predetermines and programs the variable size fill-in pattern of pixels to be added to each corner shape. Accordingly, the edge smooth software program locates all of the predetermined corner shapes and adds the corresponding predetermined variable size fill-in patterns of pixels to each corner shape.

FIGS. 7–29 constitute all of the lower-left corner shapes for which the edge smooth software of the microfiche appendix is programmed to locate and add variable size fill-in patterns of pixels. If both legs of a corner are greater than or equal to 9 and the corner is not a "U" type corner, the program does not add pixels to the corner. FIGS. 7–29 also show the corresponding variable size fill-in patterns of pixels which are programmed to be added to each corner shape by the edge smooth software program.

In order to complete the edge smooth software, a suitable program similar to the microfiche program is implemented for the remaining upper-left, lower-right and upper-right corners. As indicated above, the C language program of the microfiche appendix is not intended to be limiting and is merely an example of the software necessary to implement the invention. The software can be readily changed to accommodate a number of factors, including higher or lower magnifications, changing or adding additional corner shapes and changing or adding patterns of pixels.

Based on the foregoing definitions and illustrative figures, the software is now described using a simplified C-like pseudocode:

```
main(){
  Load(image raw data);
  Magnify(image raw data);
  for each pixel in the image{  /*Scan entire image*/
    while the pixel is in a corner{  /*check for corner pixel*/
      Check orientation of the corner;
      switch(orientation){
        case upper-left corner;
        Search for the corner
        shape;
        Add correction pattern;
        break;
        case lower-left corner;
        Search for the corner
        shape;
        Add correction pattern;
        break,
        case upper-right corner;
        Search for the corner
        shape;
        Add correction pattern;
        break;
        case lower-right corner;
        Search for the corner
        shape;
        Add correction pattern;
        break;
      }
```

-continued

```
    }
  }
  Store(enhance image);
}
```

Figure 30:
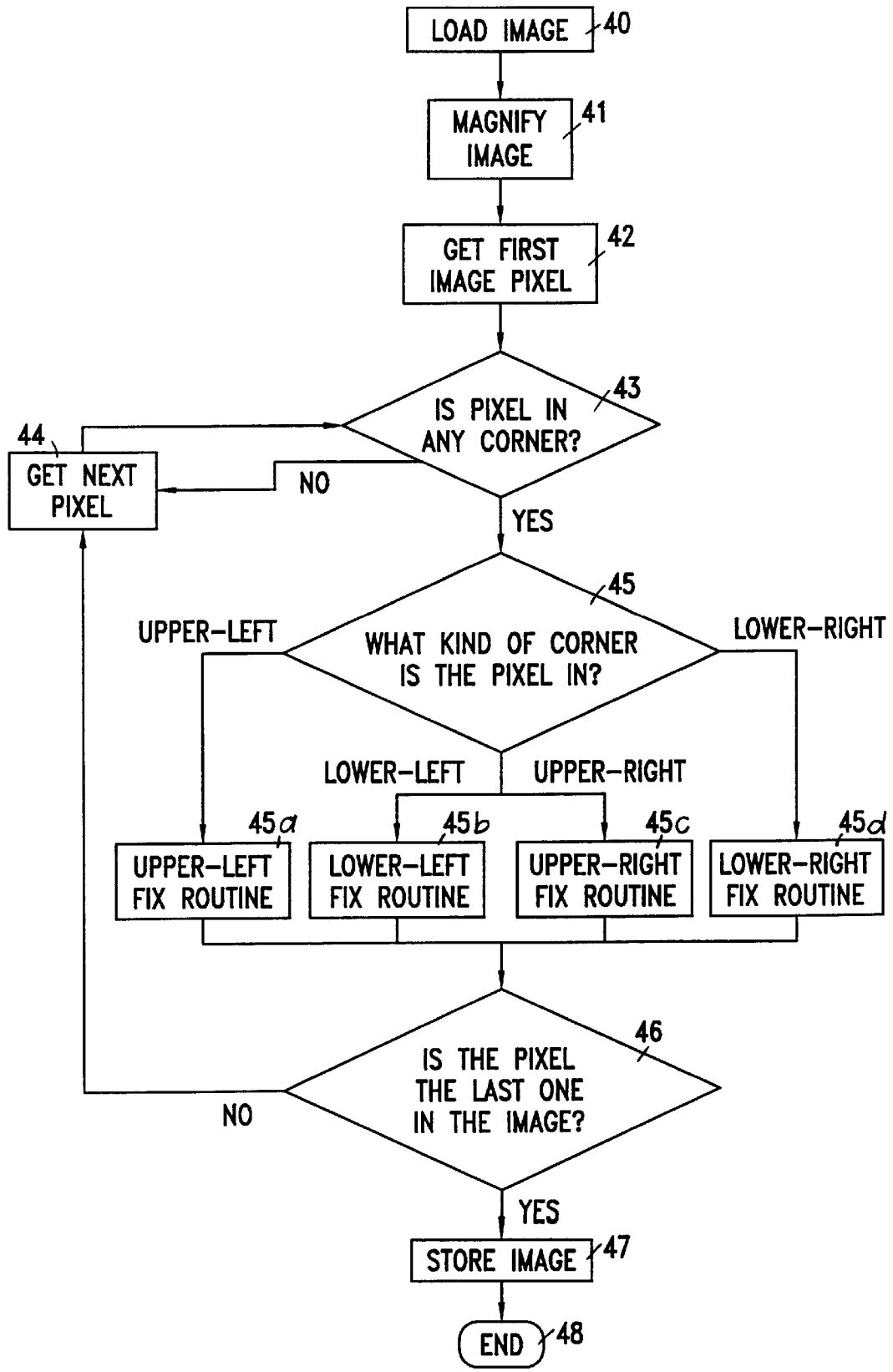
FIG. 30 is a flow chart of the edge smooth software program.
Figure 31A:
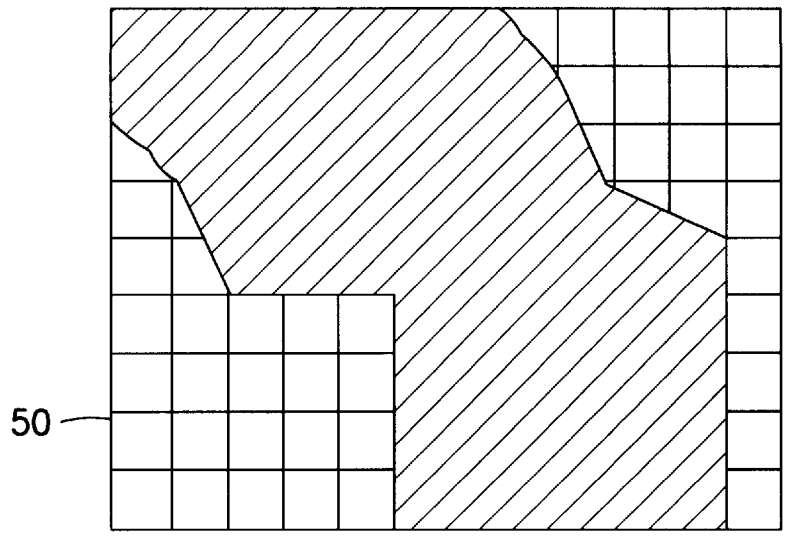
FIG. 31 is an illustration of an image being processed at three times magnification from original image to final image having smooth edges.
Figure 31B:
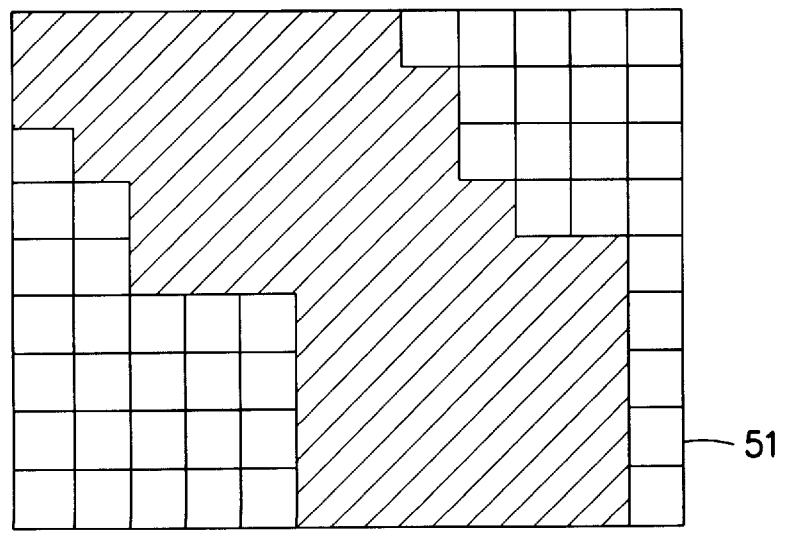
Figure 31C:
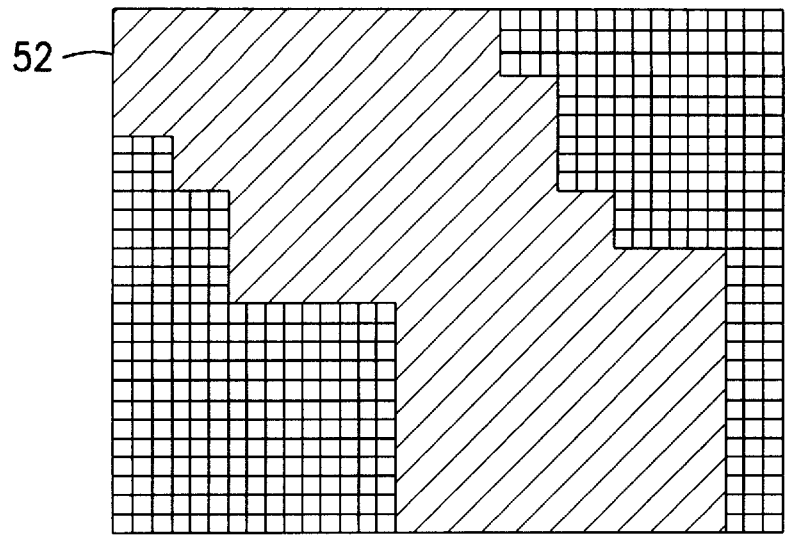
Figure 31D:
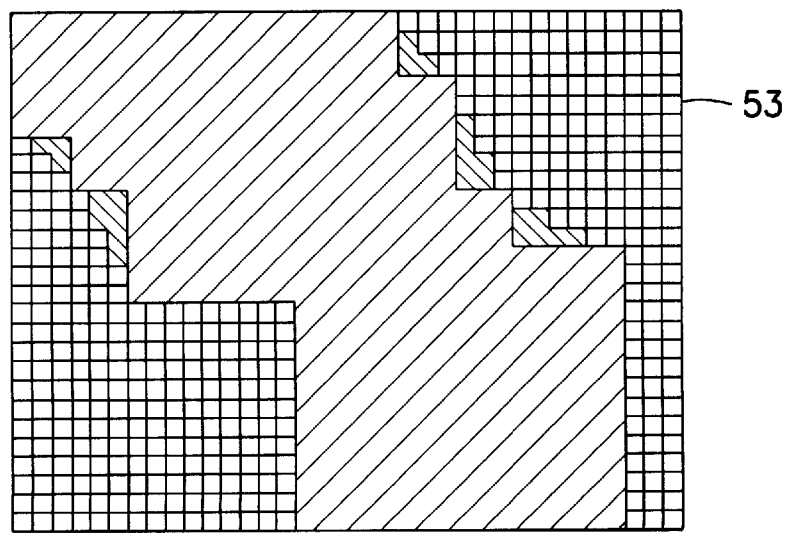

FIG. 30 depicts a flowchart of the edge smooth software program, further illustrating the function of the software. As can be seen from FIG. 30, the image is loaded in step 40 and magnified in step 41. The software then views each pixel in the image in step 42 and determines if the pixel is in a corner in step 43. If a pixel is not in a corner, the software discards the pixel and then views the next pixel in step 44. If the pixel is in a corner, the software determines the type of orientation of the corner that the pixel is in step 45, i.e., whether the pixel is in an upper-left corner, a lower-left corner, an upper-right corner or a lower-right corner. Next, depending upon the position and shape of the corner, the software fixes the routine for the corresponding corner orientation in steps, 45a, 45b, 45c and 45d, respectively, by adding variable size fill-in patterns of pixels to enhance the corners so as to smooth the edges of the corners. The software repeats this procedure if the pixel is not the last one in the image in step 46, thereby assuring that all of the corners in the image are enhanced. When the last pixel is received by the software and completes the foregoing program, the software stores the image in step 47 and the program ends in step 48.

FIG. 31 is an example of an image being processed from an original image to a final enhanced image with smooth edges. Specifically, FIG. 31 shows an original image 50 before scanning, the image after scanning at low resolution 51, and the same image at high resolution just prior to laser printing 52. FIG. 31 further shows an enhanced image 53 in which the edge smooth software adds variable size fill-in patterns of pixels to the corners of the image prior to printing at high resolution to smooth the jagged edges of the corners which were formed when some of the information from the original image was lost during low resolution scanning. The added high resolution pixels are those shown in the dotted pattern.

Although the preferred embodiments illustrate the edge smooth software's ability to add variable size fill-in patterns of pixels to the jagged edges of corners in an image, the software can also be used for deleting or subtracting improperly positioned pixels of an image by adding background (i.e., white) pixels over the color (i.e., black) pixels in the image.

Although illustrative preferred embodiments have been described herein in detail, it should be noted and will be appreciated by those skilled in the art that numerous variations may be made within the scope of this invention without departing from the principle of this invention and without sacrificing its chief advantages. The terms and expressions have been used as terms of description and not terms of limitation. There is no intention to use the terms or expressions to exclude any equivalents of features shown and described or portions thereof and this invention should be defined in accordance with the claims which follow.

```
void leftdown (il, jl, kl)
  unsigned int il, j1;
  int k1;
```

-continued

```
    {
unsigned int i, j;
int k;
unsigned int i_m1, i_m2, i_m3, i_m4, i_m5;
unsigned int j_ml;
int k_ml;
unsigned int i_p1, i_p2;
unsigned int j_p1, j_p2, j_p3, j_p4, j_p5, j_p6, j_p7;
unsigned int k_p1, k_p2, k_p3, k_p4, k_p5, k_p6, k_p7;
int state1, state2;
extern unsigned char *data, *image;
extern unsigned int iWidth, dWidth;
extern unsigned char bitd[8];
i = i1;
j = j1;
k = k1;
    i_p1 = i + dWidth;
    i_m1 = i - dWidth;
    i_m2 = i_m1 - dWidth;
    i_m3 = i_m2 - dWidth;
    i_m4 = i_m3 - dWidth;
    i_m5 = i_m4 - dWidth;
    if (k == 0) {
        k_m1 = 7;
        j_m1 = j - 1;
         {
        else {
        k_m1 = k - 1;
        j_m1 = j;
        };
    if (k == 7) {
        k_p1 = 0;
        j_p1 = j + 1;
        }
        else {
        k_p1 = k + 1;
        j_p1 = j;
        };
    if (k_p1 == 7) {
        k_p2 = 0;
        j_p2 = j_p1 + 1;
        }
        else {
        k_p2 = k_p1 + 1;
        j_p2 = j_1;
        };
    if (k_p2 == 7) {
        k_p3 = 0;
        j_p3 = j_p2 + 1;
        }
        else {
        k_p3 = k_p2 + 1;
        j_p3 = j_p2;
        };
    if (k_p3 == 7) {
        k_p4 = 0;
        j_p4 = j_p3 + 1;
        }
        else {
        k_p4 = k_p3 + 1;
        j_p4 = j_p3;
        };
    if (k_p4 == 7) {
        k_p5 = 0;
        j_p5 = j_p4 + 1;
        }
        else {
        k_p5 = k_p4 + 1;
        j_p5 = j_p4;
        };
    state1 = 11;
    if ((*(data+i_m1+j)&bitd[k]) != 0) goto lld1;
    state1 = 1;
    if ((*(data+i_m1+j_m1)&bitd[k_ml]) == 0) goto 11d1;
    state1 = 12;
    if ((*data+i_m2+j)&bitd[k]) != 0) goto lld1;
    state1 = 2;
    if ((*(data+i_m2+j_m1)&bitd[k_ml]) == 0) goto 11d1;
    state1 = 13;
    if ((*(data+i_m3+j*bitd[k]) != 0) goto lld1;
    state1 = 3;
    if ((*(data+i_m3+j_m1)&bitd[k_m1]) == 0) goto 11d1;
    state1 = 14;
    if ((*(data+i_m4+j)&bitd[k]0 != 0) goto 11d1;
    state1 = 4;
    if ((*(data+i_m4+j_ml)&bitd[k_ml]) == 0) goto 11d1;
    if ((*(data+i_m5+j)&bitd[k]) != 0) state1 = 15;
lld1;
    state2 = 11;
    if ((*(data+i+j_p1)&bitd[k_pl]) != 0) goto 11d2;
    state2 = 1;
    if ((*(data+i_p1+j_p1)&bitd[k_p1)) == 0) goto lld2;
    state2 = 12;
    if ((*(data+i+j_p2)&bitd[k_p2]) != 0) goto 11d2;
    state2 = 2;
    if ((*(dat+i_pl+j_p2)&bitd[k_p2]) == 0) goto 11d2;
    state2 = 13;
    if ((*(data+i+j_p3)&bitd]k_p3]) != 0) goto lld2;
    state2 = 3;
    if ((*(data+i_p1+j_p3)&bitd[k_p3]) == 0) goto lld2;
    state2 = 14;
    if ((*(data+i+j_p4)&bitd[k_p4]) != 0) goto lld2;
    state2 = 4;
    if ((*(data+i_p1+j_p4)&bitd[k_p4]) == 0) goto lld2;
    if ((*(data+i+j_p5)&bitd[k_p5]) != 0) state2 = 15;
lld2:    i += i<<3;
    j += j<<1;
    k += k<<1;
    if (k > 15) {
        k -= 16;
        j += 2;
        }
        else if (k > 7) {
        k -= 8;
        j++;
        };
    i_p1 = i + iWidth;
    i_p2 = i_p1 + iWidth;
    i_m1 = i - iWidth;
    i_m2 = i_m1 - iWidth;
    i_m3 = i_m2 - iWidth;
    i_m4 = i_m3 - iWidth;
    i_m5 = i_m4 - iWidth;
    if (k == 7) {
        k_p1 = 0;
        j_p1 = j + 1;
        }
        else {
        k_p1 = k + 1;
        j_p1 = j;
        };
    if (k_p1 == 7) {
        k_p2 = 0;
        j_p2 = j_p1 + 1;
        }
        else {
        k_p2 = k_p1 + 1;
        j_p2 = j_p1;
        };
    if (k_p2 == 7) {
        k_p3 = 0;
        j_p3 = j_p2 + 1;
        }
        else {
        k_p3 = k_p2 + 1;
        j_p3 = j_p2;
        };
    if (k_p3 == 7) {
        k_p4 = 0;
        j_p4 = j_p3 + 1;
        }
        else {
        k_p4 = k_p3 + 1;
        j_p4 = j_p3;
        };
    if (k_p4 == 7) {
        k_p5 = 0;
        j_p5 = j_p4 + 1;
```

```
                    }
                else {
                    k_p5 = k_p4 + 1;
                    j_p5 = j_p4;
                    };
                if (k_p6 == 7) {
                    k_p7 = 0;
                    j_p7 = j_p6 + 1;
                    }
                else {
                    k_p7 = k_p6 + 1;
                    j_p7 = j_p6;
                    };
switch (state1) {
case 11:
    switch (state2) {
    case 1:
    case 12:
    case 13:
        * (image+i_p2+j) != bitd[k];       /* add(i+2, j) */
        * (image+i_p2+j_p1) != bitd[k_p1]; /* add(i+2, j+1) */
        return;
    case 2:
    case 14:
    case 15:
            *(image+i_p2+j)    |= bitd[k];    /* add(i+2, j) */
            *(image+i_p2+j_p1) |= bitd[k_p1]; /* add(i+2, j+1) */
            *(image+i_p2+j_p2) |= bitd[k_p2]; /* add(i+2, j+2) */
            return;
    case 3:
    case 4:
            *(image+i_p2+j)    != bitd[k];    /* add(i+2, j) */
            *(image+i_p2+j_p1) |= bitd[k_p1]; /* add(i+2, j+1) */
            *(image+i_p2+j_p2) |= bitd[k_p2]; /* add(i+2, j+2) */
            *(image+i_p2+j_p3) |= bitd[k_p3]; /* add(i+2, j+3) */
            return;
    default:
            return;
    };        /* switch(state2). */
    break;
case 1:
case 12:
case 13:
    switch (state2) {
    case 11:
            *(image+i_p1+j)    |= bitd[k];    /* add(i+1, j) */
            *(image+i_p2+j)    |= bitd[k];    /* add(i+2, j) */
            return;
    case 1:
    case 12:
    case 13:
            *(image+i_p1+j)    |= bitd[k];    /* add(i+1, j) */
            *(image+i_p2+j)    |= bitd[k];    /* add(i+2, j) */
            *(image+i_p2+j_p1) |= bitd[k_p1]; /* add*i+2, j+1) */
            return;
    case 2:
    case 14:
    case 15:
            *(image+i_p1+j)    |= bitd[k];    /* add(i+1, j) */
            *(image+i_p1+j_p1) |= bitd[k_p1]; /* add(i+1, j+1) */
            *(image+i_p2+j)    |= bitd[k];    /* add(i+2, j) */
            *(image+i_p2+j_p1) |= bitd[k_p1]; /* add(i+2, j+1) */
            *(image+i_p2+j_p2) |= bitd[k_p2]; /* add(i+2, j+2) */
            *(image+i_p2+j_p3  |= bitd[k_p3]; /* add(i+2, j+3) */
            return;
    case 3:
    case 4:
            *(image+i_p1+j)    |= bitd[k];    /* add(i+1, j) */
            *(image+i_p1+j_p1) |= bitd[k_p1]; /* add(i+1, j+1) */
            *(image+i_p1+j_p2) |= bitd[k_p2]; /* add(i+1, j+2) */
            *(image+i_p1+j_p3) |= bitd[k_p3]; /* add(i+1, j+3) */
            *(image+i_p2+j)    |= bitd[k];    /* add(i+2, j) */
            *(image+i_p2+j_p1) |= bitd[k_p1]; /* add(i+2, j+1) */
            *(image+i_p2+j_p2) |= bitd[k_p2]; /* add(i+2, j+2) */
            *(image+i_p2+j_p3) |= bitd[k_p3]; /* add(i+2, j+4) */
            *(image+i_p2+j_p4) |= bitd[k_p4]; /* add(i+2, j+4) */
            *(image+i_p2+j_p5) |= bitd[k_p5]; /* add(i+2, j+5) */
            *(image+i_p2+j_p6) |= bitd[k_p6]; /* add(i+2, j+6) */
            return;
    default:
            return;
    };        /* switch(state2). */
case 2:
case 14:
case 15:
    i_m1 = i - iWidth;
    i_m2 = i_m1 - iWidth;
    switch (state2) {
    case 11:
            *(image+i+j)       |= bitd[k];    /* add(i, j) */
            *(image+i_p1+j)    |= bitd[k];    /* add(i+1, j) */
            *(image+i_p2+j)    |= bitd[k];    /* add(i+2, j) */
            return;
    case 1:
    case 12:
    case 13:
            *(image+i_m1+j)    |= bitd[k];    /* add(i-1, j) */
            *(image+i+j)       |= bitd[k];    /* add(i, j) */
            *(image+i_p1+j)    |= bitd[k];    /* add(i+1, j) */
            *(image+i_p2+j)    |= bitd[k];    /* add(i+2, j) */
            *(image+i_p1+j_p1) |= bitd[k_p1]; /* add(i+1, j+1) */
            *(image+i_p2+j_p1) |= bitd[k_p1]; /* add(i+2, j+1) */
            return;
    case 2:
    case 14:
    case 15:
            *(image+i_m2+j)    |= bitd[k];    /* add(i-2, j) */
            *(image+i_m1+j)    |= bitd[k];    /* add(i-1, j) */
            *(image+i_m1+j_p1) |= bitd[k_p1]; /* add(i-1, j+1) */
            *(image+i+j)       |= bitd[k];    /* add(i, j) */
            *(image+i+j_p1)    |= bitd[k_p1]; /* add(i, j+1) */
            *(image+i+j_p2)    |= bitd[k_p2]; /* add(i, j+2) */
            *(image+i_p1+j)    |= bitd[k];    /* add(i+1, j) */
            *(image+i_p1+j_p1) |= bitd[k_p1]; /* add(i+1, j+1) */
            *(image+i_p1+j_p2) |= bitd[k_p2]; /* add(i+1, j+2) */
            *(image+i_p1+j_p3) |= bitd[k_p3]; /* add(i+1, j+3) */
            *(image+i_p2+j)    |= bitd[k];    /* add(i+2, j) */
            *(image+i_p2+j_p1) |= bitd[k_p1]; /* add(i+2, j+1) */
            *(image+i_p2+j_p2) |= bitd[k_p2]; /* add(i+2, j+2) */
            *(image+i_p2+j_p3) |= bitd[k_p3]; /* add(i+2, j+3) */
            *(image+i_p2+j_p4) |= bitd[k_p4]; /* add(i+2, j+4) */
            return;
    case 3:
    case 4:
            *(image+i_m2+j)    |= bitd[k];    /* add(i-2, j) */
            *(image+i_m2+j_p1) |= bitd[k_p1]; /* add(i-2, j+1) */
            *(image+i_m1+j)    |= bitd[k];    /* add(i-1, j) */
            *(image+i_m1+j_p1) |= bitd[k_p1]; /* add(i-1, j+1) */
            *(image+i_m1+j_p2) |= bitd[k_p2]; /* add(i-1, j+2) */
            *(image+i+j)       |= bitd[k];    /* add (i, j) */
            *(image+i+j_p1)    |= bitd[k_p1]; /* add(i, j+1) */
            *(image+i+j_p2)    |= bitd[k_p2]; /* add(i, j+2) */
            *(image+i+j_p3)    |= bitd[k_p3]; /* add(i, j+3) */
            *(image+i+j_p4)    |= bitd[k_p4]; /* add(i, j+4) */
            *(image+i_p1+j)    |= bitd[k];    /* add(i+1, j) */
            *(image+i_p1+j_p1) |= bitd[k_p1]; /* add(i+1, j+1) */
            *(image+i_p1+j_p2) |= bitd[k_p2]; /* add(i+1, j+2) */
            *(image+i_p1+j_p3) |= bitd[k_p3]; /* add(i+1, j+3) */
            *(image+i_p1+j_p4) |= bitd[k_p4]; /* add(i+1, j+4) */
            *(image+i_p1+j_p5) |= bitd[k_p5]; /* add(i+1, j+5) */
            *(image+i_p2+j)    |= bitd[k];    addd(i+2, j) */
            *(image+i_p2+j_p1) |= bitd[k_p1]; /* add(i+2, j+1) */
            *(image+i_p2+j_p2) |= bitd[k_p2]; /* add(i+2, j+2) */
            *(image+i_p2+j_p3) |= bitd[k_p3]; /* add(i+2, j+3) */
            *(image+i_p2+j_p4) |= bitd[k_p4]; /* add(i+2, j+4) */
            *(image+i_p2+j_p5) |= bitd[k_p5]; /* add(i+2, j+5) */
            *(image+i_p2+j_p6) |= bitd[k_p6]; /* add(i+2, j+6) */
            *(image+i_p2+j_p7) |= bitd[k_p7]; /* add(i+2, j+7) */
            return;
    default:
            return;
    };        /* switch(state2). */
case 3:
case 4:
    i_m1 = i - iWidth;
    i_m2 = i_m1 - iWidth;
    i_m3 = i_m2 - iWidth;
    i_m4 = i_m3 - iWidth;
```

-continued

```
    i_m5 = i_m4 - iWidth;
    switch(state2) {
    case 11:
        *(image+i_m1+j) |= bitd[k];      /* add(i-1, j) */
        *(image+i+j) |= bitd[k];         /* add(i, j) */
        *(image+i_p1+j) |= bitd[k];      /* add(i+1, j) */
        *(image+i_p2+j) |= bitd[k];      /* add(i+2, j) */
        return;
    case 1:
    case 12:
    case 13:
        *(image+i_m4+j) |= bitd[k];      /* add(i-4, j) */
        *(image+i_m3+j) |= bitd[k];      /* add(i-3, j) */
        *(image+i_m2+j) |= bitd[k];      /* add(i-2, j) */
        *(image+i_m1+j) |= bitd[k];      /* add(i-1, j) */
        *(image+i+j) |= bitd[k];         /* add(i, j) */
        *(image+i_p1+j) |= bitd[k];      /* add(i+1, j) */
        *(image+i_p2+j) |= bitd[k];      /* add(i+2, j) */
        *(image+i_m1+j_p1) |= bitd[k_p1]; /* add(i-1, j+1) */
        *(image+i+j_p1) |= bitd[k_p1];   /* add(i, j+1) */
        *(image+i_p1+j_p1) |= bitd[k_p1]; /* add(i+1, j+1) */
        *(image+i_p2+j_p1) |= bitd[k_p1]; /* add(i+2, j+1) */
        return;
    case 2:
    case 14:
    case 15:
        *(image+i_m5+j) |= bitd[k];      /* add(i-5, j) */
        *(image+i_m4+j) |= bitd[k];      /* add(i-4, j) */
        *(image+i_m3+j) |= bitd[k];      /* add(i-3, j) */
        *(image+i_m2+j) |= bitd[k];      /* add(i-2, j) */
        *(image+i_m1+j) |= bitd[k];      /* add(i-1, j) */
        *(image+i+j) |= bitd[k];         /* add(i, j) */
        *(image+i_p1+j) |= bitd[k];      /* add(i+1, j) */
        *(image+i_p2+j) |= bitd[k];      /* add(i+2, j) */
        *(image+i_m3+j_p1) |= bitd[k_p1]; /* add(i-3, j+1) */
        *(image+i_m2+j_p1) |= bitd[k_p1]; /* add(i-2, j+1) */
        *(image+i_m1+j_p1) |= bitd[k_p1]; /* add(i-1, j+1) */
        *(image+i+j_p1) |= bitd[k_p1];   /* add(i, j+1) */
        *(image+i_p1+j_p1) |= bitd[k_p1]; /* add(i+1, j+1) */
        *(image+i_p2+j_p1) |= bitd[k_p1]; /* add(i+2, j+1) */
        *(image+i_m2+j_p2) |= bitd[k_p2]; /* add(i-2, j+2) */
        *(image+i_m1+j_p2) |= bitd[k_p2]; /* add(i-1, j+2) */
        *(image+i+j_p2) |= bitd[k_p2];   /* add(i, j+2) */
        *(image+i_p1+j_p2) |= bitd[k_p2]; /* add(i+1, j+2) */
        *(image+i_p2+j_p2) |= bitd[k_p2]; /* add(i+2, j+2) */
        *(image+i+j_p3) |= bitd[k_p3];   /* add(i, j+3) */
        *(image+i_p1+j_p3) |= bitd[k_p3]; /* add(i+1, j+3) */
        *(image+i_p2+j_p3) |= bitd[k_p3]; /* add(i+2, j+3) */
        *(image+i_p1+j_p4) |= bitd[k_p4]; /* add(i+1, j+4) */
        *(image+i_p2+j_p4) |= bitd[k_p4]; /* add(i+2, j+4) */
        return;
    case 3:
        *(image+i_m5+j) |= bitd[k];      /* add(i-5, j) */
        *(image+i_m4+j) |= bitd[k];      /* add(i-4, j) */
        *(image+i_m3+j) |= bitd[k];      /* add(i-3, j) */
        *(image+i_m2+j) |= bitd[k];      /* add(i-2, j) */
        *(image+i_m1+j) |= bitd[k];      /* add(i-1, j) */
        *(image+i+j) |= bitd[k];         /* add(i, j) */
        *(image+i_p1+j) |= bitd[k];      /* add(i+1, j) */
        *(image+i_p2+j) |= bitd[k];      /* add(i+2, j) */
        *(image+i_m4+j_p1) |= bitd[k_p1]; /* add(i-4, j+1) */
        *(image+i_m3+j_p1) |= bitd[k_p1]; /* add(i-3, j+1) */
        *(image+i_m2+j_p1) |= bitd[k_p1]; /* add(i-2, j+1) */
        *(image+i_m1+j_p1) |= bitd[k_p1]; /* add(i-1, j+1) */
        *(image+i+j_p1) |= bitd[k_p1];   /* add(i, j+1) */
        *(image+i_p1+j_p1) |= bitd[k_p1]; /* add(i+1, j+1) */
        *(image+i_p2+j_p1) |= bitd[k_p1]; /* add(i+2, j+1) */
        *(image+i_m3+j_p2) |= bitd[k_p2]; /* add(i-3, j+2) */
        *(image+i_m2+j_p2) |= bitd[k_p2]; /* add(i-2, j+2) */
        *(image+i_m1+j_p2) |= bitd[k_p2]; /* add(i-1, j+2) */
        *(image+i+j_p2) |= bitd[k_p2];   /* add(i, j+2) */
        *(image+i_p1+j_p2) |= bitd[k_p2]; /* add(i+1, j+2) */
        *(image+i_p2+j_p2) |= bitd[k_p2]; /* add(i+2, j+2) */
        *(image+i_m2+j_p3) |= bitd[k_p3]; /* add(i-2, j+3) */
        *(image+i_m1+j_p3) |= bitd[k_p3]; /* add(i-1, j+3) */
        *(image+i+j_p3) |= bitd[k_p3];   /* add(i, j+3) */
        *(image+i_p1+j_p3) |= bitd[k_p3]; /* add(i+1, j+3) */
        *(image+i_p2+j_p3) |= bitd[k_p3]; /* add(i+2, j+3) */
        *(image+i_m1+j_p4) |= bitd[k_p4]; /* add(i-1, j+4) */
        *(image+i+j_p4) |= bitd[k_p4];   /* add(i, j+4) */
        *(image+i_p1+j_p4) |= bitd[k_p4]; /* add(i+1, j+4) */
        *(image+i_p2+j_p4) |= bitd[k_p4]; /* add(i+2, j+4) */
        *(image+i+j_p5) |= bitd[k_p5];   /* add(i, j+4) */
        *(image+i_p1+j_p5) |= bitd[k_p5]; /* add(i+1, j+5) *
        *(image+i_p2+j_p5) |= bitd[k_p5]; /* add(i+2, j+5) *
        *(image+i_p1+j_p6) |= bitd[k_p6]; /* add(i+2, j+6) *
        *(image+i_p2+j_p6) |= bitd[k_p6]; /* add(i+2, j+6) */
        *(image+i_p2+j_p7) |= bitd[k_p7]; /* add(i+2, j+7) */
        return;
    default:
        return;
    };       /* switch(state2). */
    default:
        return;
    };       /* switch(state1). */
{
```

What is claimed is:

1. A scanner/printer system for smoothing jaggies in an image to be printed, comprising:

means for scanning an original image to obtain an array of image data pixels corresponding to said original image;

means for edge smoothing for examining said array of image data pixels to locate corners therein and the position, orientation and shape of said corners and for adding fill-in pixels to said corners according to said position, orientation and shape thereof when the edges of said shape are less than a predetermined length to smooth said jaggies associated therewith; and means for printing said array of image data pixels with said added fill-in pixels.

2. A scanner/printer system as recited in claim 1, further comprising a CCD for scanning said original image to obtain said array of image data pixels.

3. A scanner/printer system as recited in claim 1, further comprising a laser for printing said array of image data pixels with said added fill-in pixels.

4. A scanner/printer system as recited in claim 1, further comprising a PCI bus for transferring said array of image data pixels from said scanning means to said examining means and for transferring said array of image data pixels with said fill-in pixels from said adding means to said printing means.

5. A scanner/printer system as recited in claim 1, further comprising an image plane for receiving said printed array of image data pixels with said added fill-in pixels.

6. A scanner/printer system for smoothing jaggies in an image to be printed at a higher resolution than that used for scanning, comprising:

means for scanning an original image to obtain an array of image data pixels corresponding to said original image;

means for edge smoothing for examining said array of image data pixels to locate corners therein and the position, orientation and shape of said corners and for adding variable size fill-in patterns of pixels to said corners according to the shape of said corners to smooth said jaggies associated therewith when the edges of the shape are less than a predetermined length; and means for printing said array of image data pixels with said added variable size fill-in pattern of pixels.

7. A scanner/printer system as recited in claim 6, further comprising a CCD for scanning said original image to obtain said array of image data pixels.

8. A scanner/printer system as recited in claim 6, further comprising a laser for printing said array of image data pixels with said added variable size fill-in patterns of pixels.

9. A scanner/printer system as recited in claim 6, further comprising a PCI bus for transferring said array of image data pixels from said scanning means to said examining means and for transferring said array of image data pixels with said added variable size fill-in patterns of pixels from said adding means to said printing means.

10. A scanner/printer system as recited in claim 6, further comprising an image plane for receiving said printed array of image data pixels with said variable size fill-in patterns of pixels.

11. A scanner/printer system for smoothing jaggies in an image to be printed at a higher resolution than that used for scanning, comprising:

means for scanning an original image to obtain an array of image data pixels corresponding to said original image;

means for edge smoothing for examining said array of image data pixels to locate corners therein and the position, orientation and shape of said corners and for adding background pixels over color pixels associated with said corners according to said position, orientation and shape thereof when the edges of said shape are less than a predetermined length to smooth said jaggies associated therewith; and means for printing said array of image data pixels with said added background pixels.

12. A scanner/printer system as recited in claim 11, further comprising a CCD for scanning said original image to obtain said array of image data pixels.

13. A scanner/printer system as recited in claim 11, further comprising a laser for printing said array of image data pixels with said added background pixels.

14. A scanner/printer system as recited in claim 11, further comprising a PCI bus for transferring said array of image data pixels from said scanning means to said examining means and for transferring said array of image data pixels with said added background pixels from said adding means to said printing means.

15. A scanner/printer system as recited in claim 11, further comprising an image plane for receiving said printed array of image data pixels with said added background pixels.

16. A method for smoothing jaggies in an image to be printed utilizing a scanner/printer system where printing is at a higher resolution than that used for scanning, comprising:

scanning an original image to obtain an array of image data pixels corresponding to said original image;

using means for edge smoothing to examine said array of image data pixels to locate corners therein and the position, orientation and shape of said corners and to add fill-in pixels to said corners according to said position, orientation and shape thereof when the edges of said shape are less than a predetermined length to smooth said jaggies associated therewith; and printing said array of image data pixels with said added fill-in pixels.

17. A method for smoothing jaggies utilizing a scanner/printer system as recited in claim 16, further comprising transferring said array of image data pixels from a scanning means to an examining means by a PCI bus and transferring said array of image data pixels with said fill-in pixels from an adding means to a printing means by said PCI bus.

18. A method for smoothing jaggies in an image to be printed utilizing a scanner/printer system wherein printing is at a higher resolution than scanning, comprising:

scanning an original image to obtain an array of image data pixels corresponding to said original image;

using means for edge smoothing to examine said array of image data pixels to locate corners therein and the position, orientation and shape of said corners and to add variable size fill-in patterns of pixels to said corners according to said position, orientation and shape thereof when the edges of said shape are less than a predetermined length to smooth said jaggies associated therewith; and printing said array of image data pixels with said added variable size fill-in patterns of pixels.

19. A method for smoothing jaggies utilizing a scanner/printer system as recited in claim 18, further comprising transferring said array of image data pixels from a scanning means to an examining means by a PCI bus and transferring said array of image data pixels with said variable size fill-in patterns of pixels from an adding means to a printing means by said PCI bus.

20. A method for smoothing jaggies utilizing a scanner/printer system as recited in claims 18, wherein said pixels are added to upper-left, lower-left, upper-right, lower-right and U-type corners of said array of image data pixels.

21. A method for smoothing jaggies utilizing a scanner/printer system as recited in claim 18, wherein said pixels are in bit map form.

22. A method for smoothing jaggies in an image to be printed utilizing a scanner/printer system, comprising:

scanning an original image to obtain an array of image data pixels corresponding to said original image;

examining said array of image data pixels to locate corners therein and the position, orientation and shape of said corners;

adding background pixels over color pixels associated with said corners according to said position, orientation and shape thereof when the edges of said shape are less than a predetermined length to smooth said jaggies associated therewith; and printing said array of image data pixels with said added background pixels.

23. A method for smoothing jaggies utilizing a scanner/printer system as recited in claim 22, further comprising transferring said array of image data pixels from a scanning means to an examining means by a PCI bus and transferring said array of image data pixels with said added background pixels from an adding means to a printing means by said PCI bus.

* * * * *